(12) United States Patent
Nambara

(10) Patent No.: US 9,829,704 B2
(45) Date of Patent: Nov. 28, 2017

(54) HEAD-UP DISPLAY DEVICE

(71) Applicant: DENSO CORPORATION, Kariya, Aichi-pref. (JP)

(72) Inventor: Takahiro Nambara, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/326,982

(22) PCT Filed: Jul. 14, 2015

(86) PCT No.: PCT/JP2015/003562
§ 371 (c)(1),
(2) Date: Jan. 17, 2017

(87) PCT Pub. No.: WO2016/017097
PCT Pub. Date: Feb. 4, 2016

(65) Prior Publication Data
US 2017/0199382 A1 Jul. 13, 2017

(30) Foreign Application Priority Data

Jul. 30, 2014 (JP) ................................ 2014-155482

(51) Int. Cl.
*G03B 21/14* (2006.01)
*G02B 27/01* (2006.01)
(Continued)

(52) U.S. Cl.
CPC .......... *G02B 27/0149* (2013.01); *B60K 35/00* (2013.01); *G02B 13/16* (2013.01);
(Continued)

(58) Field of Classification Search
CPC ............ G03B 21/14; G02B 2027/0159; G02B 2027/0163; G02B 2027/0181;
(Continued)

(56) References Cited

U.S. PATENT DOCUMENTS 8,775,283 B1 * 7/2014 Forbes, Jr. ............. G05D 17/00
340/870.02
2011/0235003 A1 9/2011 Konno
(Continued)

FOREIGN PATENT DOCUMENTS

JP 2013064985 A 4/2013
WO WO-2009019973 A1 2/2009

*Primary Examiner* — William C Dowling
(74) *Attorney, Agent, or Firm* — Harness, Dickey & Pierce, P.L.C.

(57) ABSTRACT

An HUD device which is installed on a vehicle and displays an image as a virtual image in a visible region in a manner that is visually recognizable to an occupant by projecting the image onto a windshield includes an oscillator which oscillates a laser light flux, a screen member which has unevenness in a projection region in which the image is formed by projection of the laser light flux, a projection optical system which projects the laser light flux onto the screen member, a magnifying optical system which magnifies the image, projects the image onto the windshield, and guides light of the image to the visible region, and a controller which causes a focal length of the projection optical system to temporally oscillate. Accordingly, an appropriate visible region is secured, luminance inconsistencies in an image which is visually recognized are suppressed, and it becomes easy to secure space.

12 Claims, 18 Drawing Sheets

(51) Int. Cl.

| | |
|---|---|
| *B60K 35/00* | (2006.01) |
| *G03B 21/20* | (2006.01) |
| *G02B 27/48* | (2006.01) |
| *G03B 21/00* | (2006.01) |
| *G03B 21/62* | (2014.01) |
| *G02B 13/16* | (2006.01) |

(52) U.S. Cl.
CPC ..... *G02B 27/0101* (2013.01); *G02B 27/0179* (2013.01); *G02B 27/48* (2013.01); *G03B 21/008* (2013.01); *G03B 21/2033* (2013.01); *G03B 21/62* (2013.01); *B60K 2350/1072* (2013.01); *B60K 2350/2052* (2013.01); *B60K 2350/2095* (2013.01); *B60K 2350/352* (2013.01); *B60K 2350/921* (2013.01); *G02B 2027/011* (2013.01); *G02B 2027/013* (2013.01); *G02B 2027/0159* (2013.01); *G02B 2027/0185* (2013.01)

(58) Field of Classification Search
CPC ........ G02B 2027/0196; G02B 2027/01; G02B 27/10; G02B 27/0101; G02B 27/0149
USPC ............................... 353/12–14; 359/629–633
See application file for complete search history.

(56) References Cited

U.S. PATENT DOCUMENTS

| | | | |
|---|---|---|---|
| 2013/0050655 A1 | 2/2013 | Fujikawa et al. | |
| 2016/0004075 A1* | 1/2016 | Ando | G03B 21/2033 353/13 |
| 2016/0070099 A1* | 3/2016 | Inomata | G02B 5/02 359/631 |
| 2016/0313562 A1* | 10/2016 | Saisho | G02B 27/0179 |
| 2016/0320616 A1* | 11/2016 | Ichii | G02B 27/0179 |

* cited by examiner

HEAD-UP DISPLAY DEVICE

CROSS-REFERENCE TO RELATED APPLICATIONS

This application is a U.S. National Phase Application under 35 U.S.C. 371 of International Application No. PCT/JP2015/003562 filed on Jul. 14, 2015 and published in Japanese as WO 2016/017097 A1 on Feb. 4, 2016. This application is based on and claims the benefit of priority from Japanese Patent Application No. 2014-155482 filed on Jul. 30, 2014. The entire disclosures of all of the above applications are incorporated herein by reference.

TECHNICAL FIELD

The present disclosure relates to a head-up display device (hereinafter, HUD device will be used as shorthand) which is installed on a moving object and displays an image as a virtual image in a visible region in a manner that is visually recognizable to an occupant by projecting the image onto a projection member.

BACKGROUND ART

In the related art, a HUD device which is installed on a moving object and displays an image as a virtual image in a visible region in a manner that is visually recognizable to an occupant by projecting the image onto a projection member is known. A HUD device disclosed in Patent Literature 1 is provided with an oscillator which oscillates a laser light flux, a screen member which has unevenness and forms an image, a projection optical system which projects the laser light flux onto the screen member, and a magnifying optical system which magnifies the image, projects onto a projection region, and guides the light of the image to the visible region.

PRIOR PATENT LITERATURE

Patent Literature

Patent Literature 1: JP 2013-64985 A

SUMMARY OF INVENTION

In an HUD device which is provided with an oscillator which oscillates a laser light flux, when a screen member with no unevenness is used, an area of a visible region may not be secured. However, on the other hand, when the screen member of Patent Literature 1 which has unevenness is used, although the area of the visible region can be obtained, a speckle pattern is generated due to the laser light flux being projected onto the screen member, and there is a concern that luminance inconsistencies will arise in the image which is visually recognized.

When a magnifying optical system which magnifies the light of the image and guides the light to the visible region is used, the speckle pattern is also magnified, and the luminance inconsistencies are more notably visually recognized. On the other hand, when an optical system which guides the light of the image to the visible region without magnifying the light is used, the size of the image which is visually recognized becomes small or a screen member of a large size must be used, and it becomes difficult to secure the space for installing the HUD device, which displays an image of an easily visually recognizable size as a virtual image, on a moving object.

The present disclosure has been made in light of the points described above, and an object thereof is to provide a HUD device which secures an appropriate visible region, suppresses luminance inconsistencies in an image which is visually recognized, and easily secures space.

In the present disclosure, a head-up display device, mounted on a moving object, that displays an image as a virtual image in a visible region in a manner that is visually recognizable to an occupant by projecting the image onto a projection member, includes an oscillator which oscillates laser light flux, a screen member which has unevenness in a projection region in which the image is formed by projection of the laser light flux, a projection optical system which projects the laser light flux onto the screen member, a magnifying optical system which magnifies the image, projects the image onto the projection member, and guides light of the image to the visible region, and a variable focal point unit which causes a focal length of the projection optical system to temporally oscillate.

According to the disclosure, an oscillator which oscillates a laser light flux, a screen member which has unevenness and forms an image, a projection optical system which projects the laser light flux onto the screen member and in which (the size of) the focal length is caused to temporally oscillate by a variable focal point unit, and a magnifying optical system which guides light of an image to a visible region by magnifying the image, projects onto a projection member are provided. Accordingly, the laser light flux is projected onto the screen member which has unevenness as light in which a speckle pattern is temporally averaged while the focal length of the projection optical system oscillates in the projection direction due to the variable focal point unit.

The light of the image which is formed by the screen member is diffused by the unevenness, and is guided to the visible region while the image is magnified by the magnifying optical system. Therefore, it is possible to provide a HUD device which secures an appropriate visible region, suppresses luminance inconsistencies in an image which is visually recognized, and easily secures space for installing the HUD device, which displays an image of an easily visually recognizable size as a virtual image, on a moving object.

DESCRIPTION OF EMBODIMENTS

Hereinafter, description will be given of the multiple embodiments of the present disclosure based on the drawings. Corresponding constituent elements in each embodiment are given the same signs, and there are cases in which duplicated explanation is omitted. In a case in which only a portion of the configuration in each embodiment is described, the configuration of another embodiment which is described earlier may be applied for the other portions of the configuration. In addition to the combinations of configurations clearly depicted in the explanation of the embodiments, as long as problems do not particularly arise in a combination, the configurations of multiple embodiments may be partially combined with each other, even when not clearly described.

First Embodiment

Figure 1:
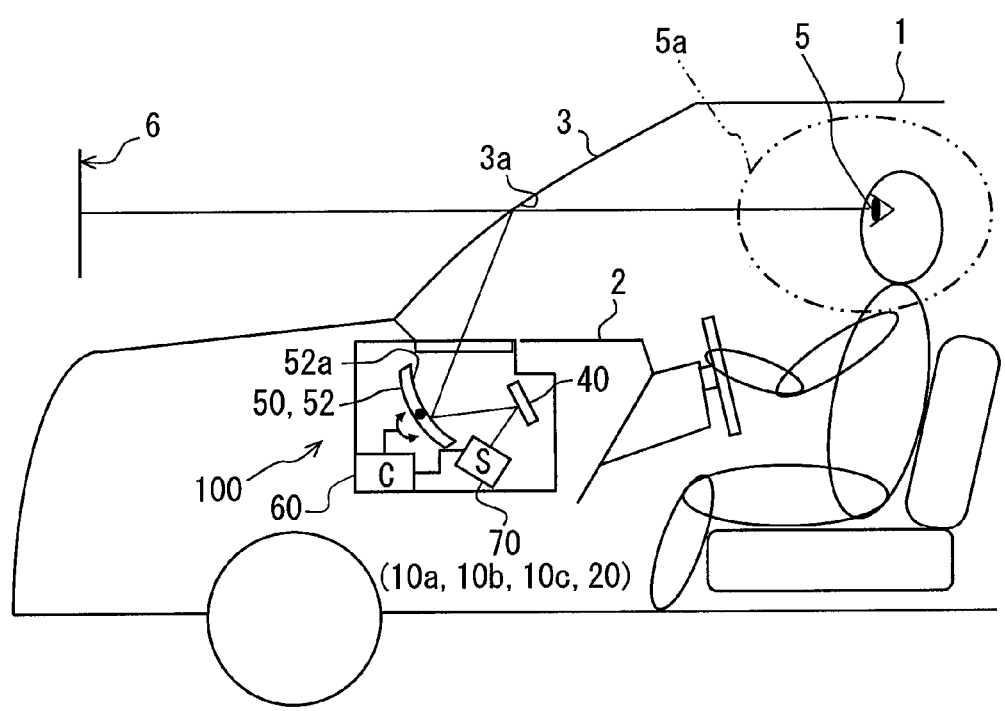
FIG. 1 is a schematic diagram illustrating an installed state of a HUD device in a vehicle in a first embodiment.

As illustrated in FIG. 1, a head-up display device 100 according to the first embodiment of the present disclosure is installed in a vehicle 1, which is a type of moving object, and is stored inside an instrument panel 2. The HUD device 100 projects an image onto a windshield 3 which serves as a projection member of the vehicle 1. Accordingly, the HUD device 100 displays the image in a visible region 4 as a virtual image to be visually recognizable by an occupant of the vehicle 1. In other words, the light of the image which is reflected on the windshield 3 reaches an eye point 5 of the occupant inside a vehicle compartment of the vehicle 1, and the occupant senses the light. The occupant is capable of recognizing various types of image which are displayed as a virtual image 6. Examples of various information which is displayed as the virtual image 6 include vehicle state values such as vehicle speed and remaining fuel level, or vehicle information such as road information and visibility auxiliary information.

In the windshield 3 of the vehicle 1, the surface of the inside of the vehicle compartment forms a projection surface 3a, onto which an image is projected, in a concave surface shape which is curved, in a planar surface shape which is flat, or the like. The windshield 3 may have an angle difference for overlaying the virtual image 6 which is formed by reflecting on each surface between the surface on the inside of the vehicle compartment and the surface on the outside of the vehicle compartment. Alternatively, the windshield 3 is provided with a vapor deposited film, a film, or the like for suppressing the luminance of the virtual image 6 caused by the reflection of the surface on the outside of the chamber. A configuration may be adopted in which, instead of the windshield 3, a combiner which is separate from the vehicle 1 is installed inside the vehicle 1 as the projection member, and an image is projected onto the combiner.

Figure 2:
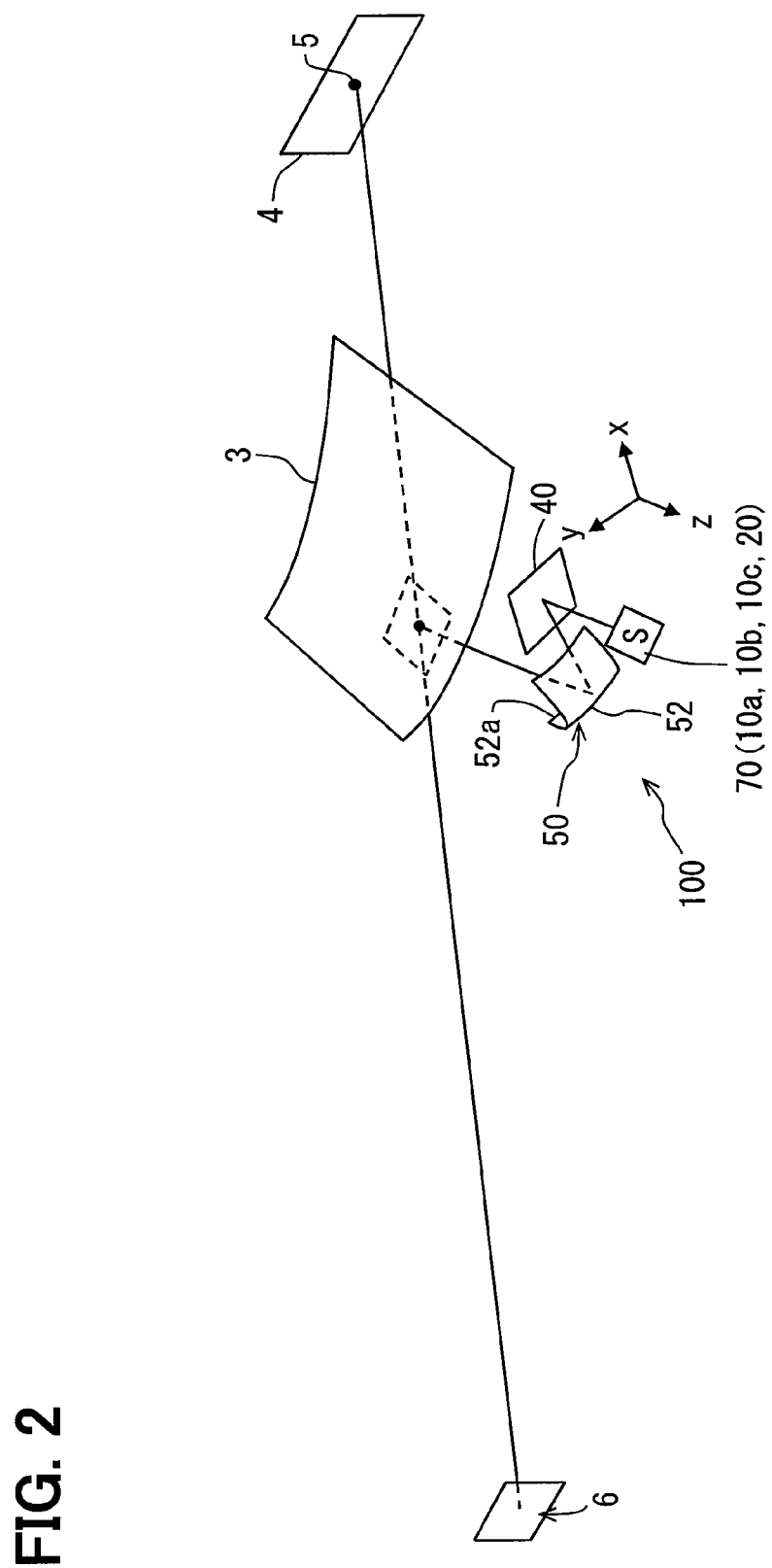
FIG. 2 is a schematic diagram illustrating the schematic configuration of the HUD device in the first embodiment.

As illustrated in FIG. 2, the visible region 4 is a region in which the image becomes visually recognizable as the virtual image 6. The visible region 4 is set in consideration of an eye range 5a which is a spatial region in which the eye point 5 of the occupant who is seated in the seat may be present. For example, as in the present embodiment, in consideration of the eye range 5a, due to the visible region 4 of a sufficient area being set, even if the eye point 5 of the occupant moves slightly, the occupant becomes capable of visually recognizing the image which serves as the virtual image 6.

As illustrated in FIGS. 1 and 2, the HUD device 100 is provided with a controller 60, multiple oscillators 10a, 10b, and 10c, a projection optical system 20, a screen member 40, and a magnifying optical system 50. Here, a laser scanner 70 includes the three oscillators 10a to 10c and the projection optical system 20.

Figure 3:
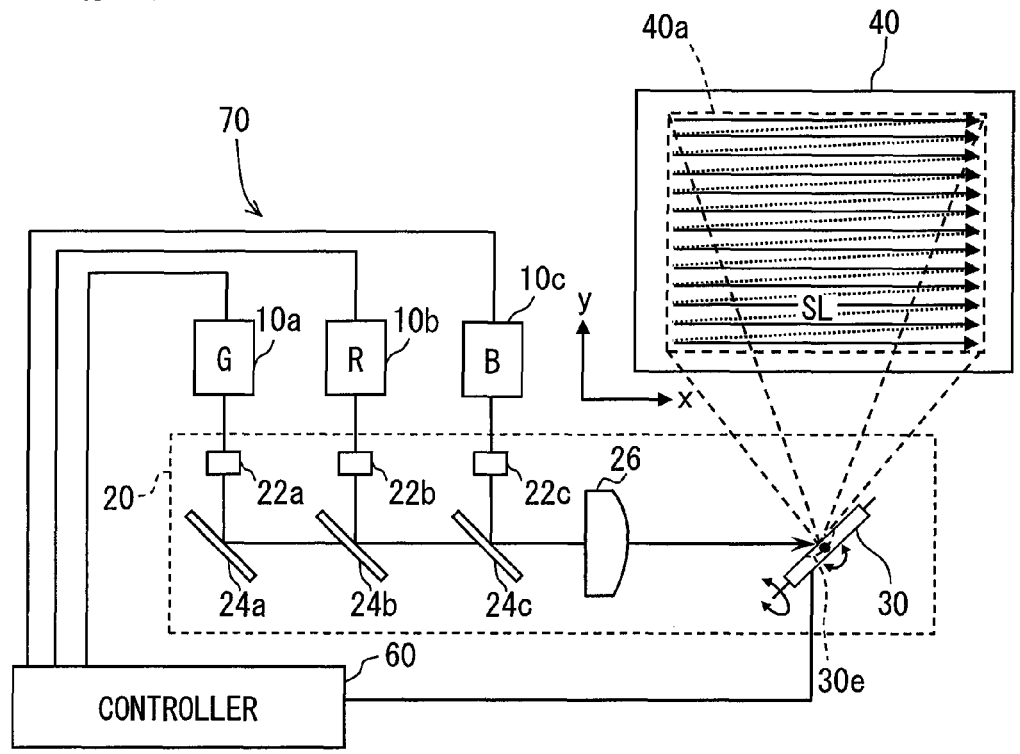
FIG. 3 is a schematic diagram illustrating an oscillator, a projection optical system, and a screen member in the first embodiment.

The controller 60 is a control circuit which includes an arithmetic processing device, a memory, and the like. As illustrated in FIGS. 1, 3, and the like, the controller 60 is electrically connected to the oscillators 10a to 10c, a scanning mirror 30 of the projection optical system 20, a concave mirror 52 of the magnifying optical system 50, and the like.

As illustrated in FIG. 3, the three oscillators 10a to 10c oscillate laser lights of different hues from each other in light flux shapes. The oscillator 10a oscillates a green laser light flux with a peak wavelength of 560 nm, for example. The oscillator 10b oscillates a red laser light flux with a peak wavelength of 635 nm, for example. The oscillator 10c oscillates a blue laser light flux with a peak wavelength of 450 nm, for example.

Here, the oscillators 10a to 10c are electrically connected to the controller 60. The oscillators 10a to 10c oscillate laser light fluxes according to electrical signals from the controller 60. It becomes possible to reproduce various colors by additively mixing the three colors of laser lights which are oscillated from the oscillators 10a to 10c. The laser light fluxes which are oscillated from the oscillators 10a to 10c are propagated toward shaping lenses 22a, 22b, and 22c, respectively, of the projection optical system 20.

The projection optical system 20 is an optical system which projects the laser light fluxes onto the screen member 40. The projection optical system 20 of the first embodiment includes the three shaping lenses 22a to 22c, three dichroic filters 24a, 24b, and 24c, a condenser lens 26, and the scanning mirror 30 of a Micro Electro Mechanical System (MEMS).

The three shaping lenses 22a to 22c are disposed leaving an interval of 5 mm, for example, in the propagation direction of the laser light fluxes in relation to the oscillators 10a to 10c which correspond to the shaping lenses 22a to 22c, respectively. The shaping lenses 22a to 22c form the laser light fluxes by refracting the laser light fluxes from the corresponding oscillators 10a to 10c.

The three dichroic filters 24a to 24c are disposed leaving an interval of 4 mm, for example, in the propagation direction of the laser light fluxes in relation to the shaping lenses 22a to 22c which correspond to the dichroic filters 24a to 24c, respectively. Each of the dichroic filters 24a to 24c reflects the laser light flux of a specific wavelength among the laser light fluxes which pass through the corresponding shaping lenses 22a to 22c, and reflects the laser light fluxes of the other wavelengths. Specifically, the dichroic filter 24a which corresponds to the shaping lens 22a reflects the green laser light flux. The dichroic filter 24b which corresponds to the shaping lens 22b reflects the red laser light flux, and transmits the other laser light fluxes. The dichroic filter 24c which corresponds to the shaping lens 22c reflects the blue laser light flux, and transmits the other laser light fluxes.

Here, the dichroic filter 24b is disposed leaving an interval of 6 mm, for example, in the propagation direction of the green laser light flux after reflection by the dichroic filter 24a. The dichroic filter 24c is disposed leaving an interval of 6 mm, for example, in the propagation direction of the red laser light flux after reflection by the dichroic filter 24b. Due to this disposition mode, the green laser light flux after reflection by the dichroic filter 24a is mixed with the red laser light flux after reflection by the dichroic filter 24b. The green laser beam and the red laser light flux pass through the dichroic filter 24c and are mixed with the blue laser light flux after reflection by the dichroic filter 24c. In this manner, the three colors of laser lights may be additively mixed.

The condenser lens 26 is disposed leaving an interval of 4 mm, for example, in the propagation direction of the laser light flux after transmission by the dichroic filter 24c. The condenser lens 26 is a plano-convex lens in which the dichroic filter 24c side is formed in a planar shape, and the scanning mirror 30 side is formed in a convex shape. The condenser lens 26 condenses the laser light fluxes from the dichroic filters 24a to 24c. The laser light flux which passes through the condenser lens 26 is propagated toward the scanning mirror 30.

Figure 4:
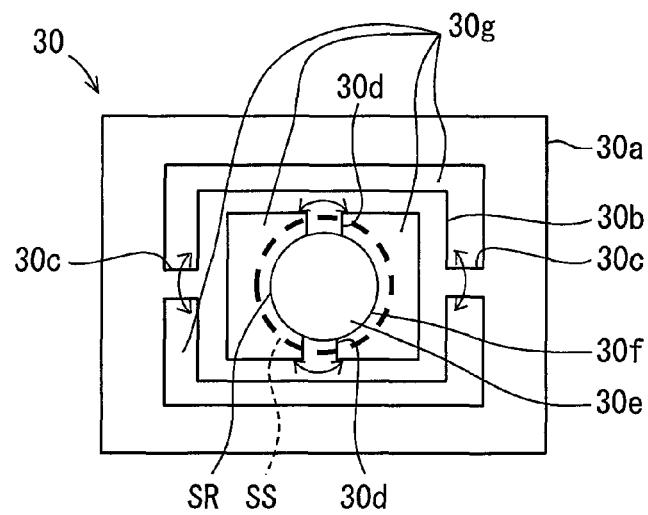
FIG. 4 is a top view illustrating a scanning mirror in the first embodiment in a schematically enlarged state.

The scanning mirror 30 is a MEMS mirror which functions as a scanning unit which temporally scans the projection direction of the laser light flux. Specifically, as illustrated in FIG. 4, the scanning mirror 30 includes an outer frame 30a, an inner frame 30b, horizontal torsion rods 30c, vertical torsion rods 30d, a reflecting surface 30e, and a transmission portion 30g. The outer frame 30a is a rectangular frame which is positioned on the outside of the scanning mirror 30, and the inner frame 30b is a rectangular frame which is positioned between the outer frame and the reflecting surface. Two of the horizontal torsion rods 30c which are parallel to a direction x are provided between the outer frame 30a and the inner frame 30b. Two of the vertical torsion rods 30d which are parallel to a direction y are provided between the inner frame 30b and the reflecting surface 30e. The reflecting surface 30e which is provided in the center of the scanning mirror 30 is formed in a thin film shape using metal vapor deposition of aluminum or the like so as to reflect the laser light flux. In the periphery of the reflecting surface 30e, the transmission portion 30g which is capable of transmitting the laser light flux is formed in an opening shape in a portion in which the horizontal torsion rods 30c and the vertical torsion rods 30d are not formed of the space between the outer frame 30a and the inner frame 30b and the space between the inner frame 30b and the reflecting surface 30e.

The scanning mirror 30 is electrically connected to the controller 60, and the horizontal torsion rods 30c and the vertical torsion rods 30d are separately twisted according to the scanning signal of the controller 60. According to the twisting, the orientation of the reflecting surface 30e may be changed, and it becomes possible to temporally scan the projection direction of the laser light flux from the condenser lens 26.

Figure 5:
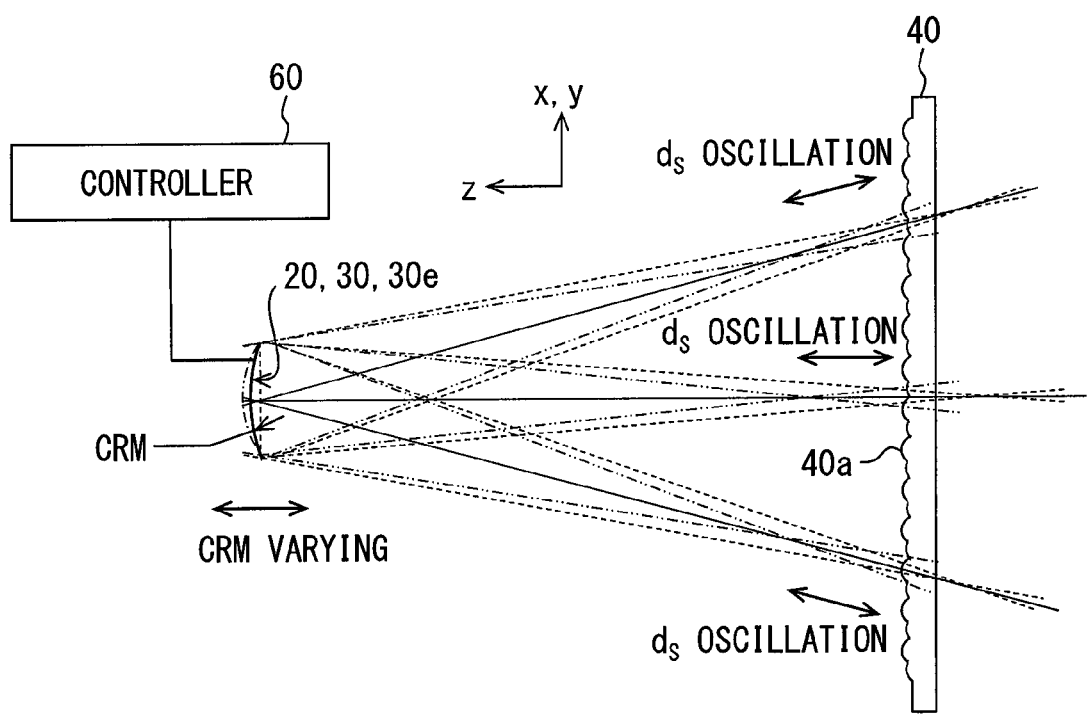
FIG. 5 is a schematic diagram illustrating the relationship between the scanning mirror and the screen member in the first embodiment.
Figure 6:
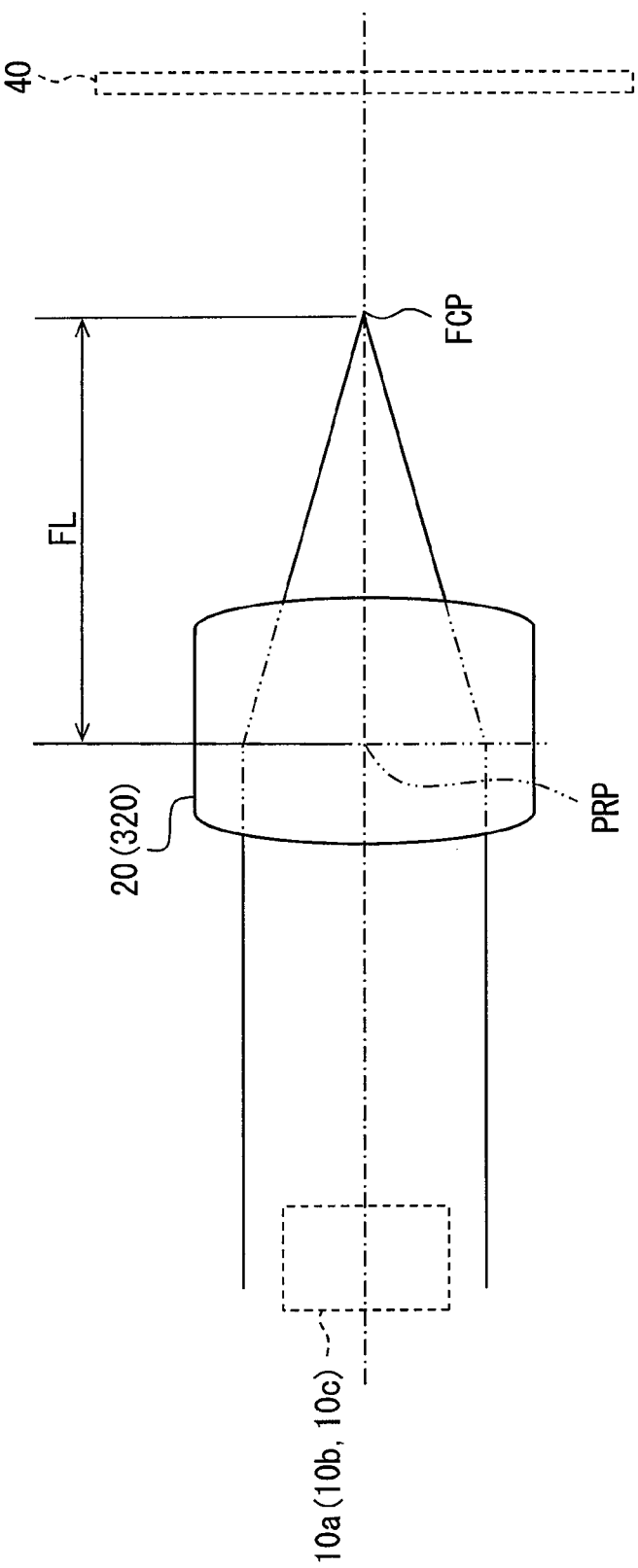
FIG. 6 is a schematic diagram for explaining a focal length of the projection optical system in the first and a third embodiment.

As illustrated in FIG. 5, a radius of curvature CRM of the reflecting surface 30e of the scanning mirror 30 varies temporally due to the drive signals from the controller 60. Due to variations in the radius of curvature CRM of the reflecting surface 30e, (the size of) a focal length FL of the projection optical system 20 oscillates temporally. Although schematically illustrated in FIG. 6 by way of precaution, the focal length FL of the projection optical system 20 in the present embodiment is the length along the optical axis between a principle point PRP and a focal point FCP in a case in which collimated light fluxes are incident from the side of the oscillators 10a to 10c.

Particularly in the present embodiment, as illustrated in FIG. 5, at the point in time at which the laser light flux from the condenser lens 26 is incident on the scanning mirror 30, the laser light flux is incident in a state in which a spot size SS is larger than a size SR of the reflecting surface 30e. Of the laser light fluxes, the light flux which enters from the outside of an outer edge 30f of the reflecting surface 30e passes through the scanning mirror 30 due to the transmission portion 30g and is emitted to the outside of the projection optical system 20. In other words, the scanning mirror 30 of the present embodiment also functions as an aperture.

In this manner, the laser light fluxes which are reflected by the reflecting surface 30e are projected toward a projection region 40a of the screen member 40 while temporally scanning the projection direction. Specifically, the projection direction of the laser light fluxes is sequentially scanned in the arrow direction of FIG. 3 along multiple scan lines SL. As a result of the control by the controller described above, in the projection region 40a, the position at which the laser light flux is projected moves and the laser light flux is continually pulse projected, and thus, an image is rendered and formed. The image which is rendered on the projection region 40a in this manner is rendered and formed in the projection region 40a at a frame rate of 60 frames per second as an image which has 480 pixels in the direction x and 240 pixels in the direction y, for example.

The screen member 40 in the first embodiment is a reflective screen which is formed by vapor depositing aluminum onto the surface of a substrate which includes a synthetic resin, glass, or the like. The screen member 40 has unevenness on the projection region 40a. Although depicted in detail in FIGS. 7 and 8, the screen member 40 is formed as a micro mirror array which includes multiple optical elements 42 which are arranged in a grid in the projection region 40a to form unevenness.

Figure 7:
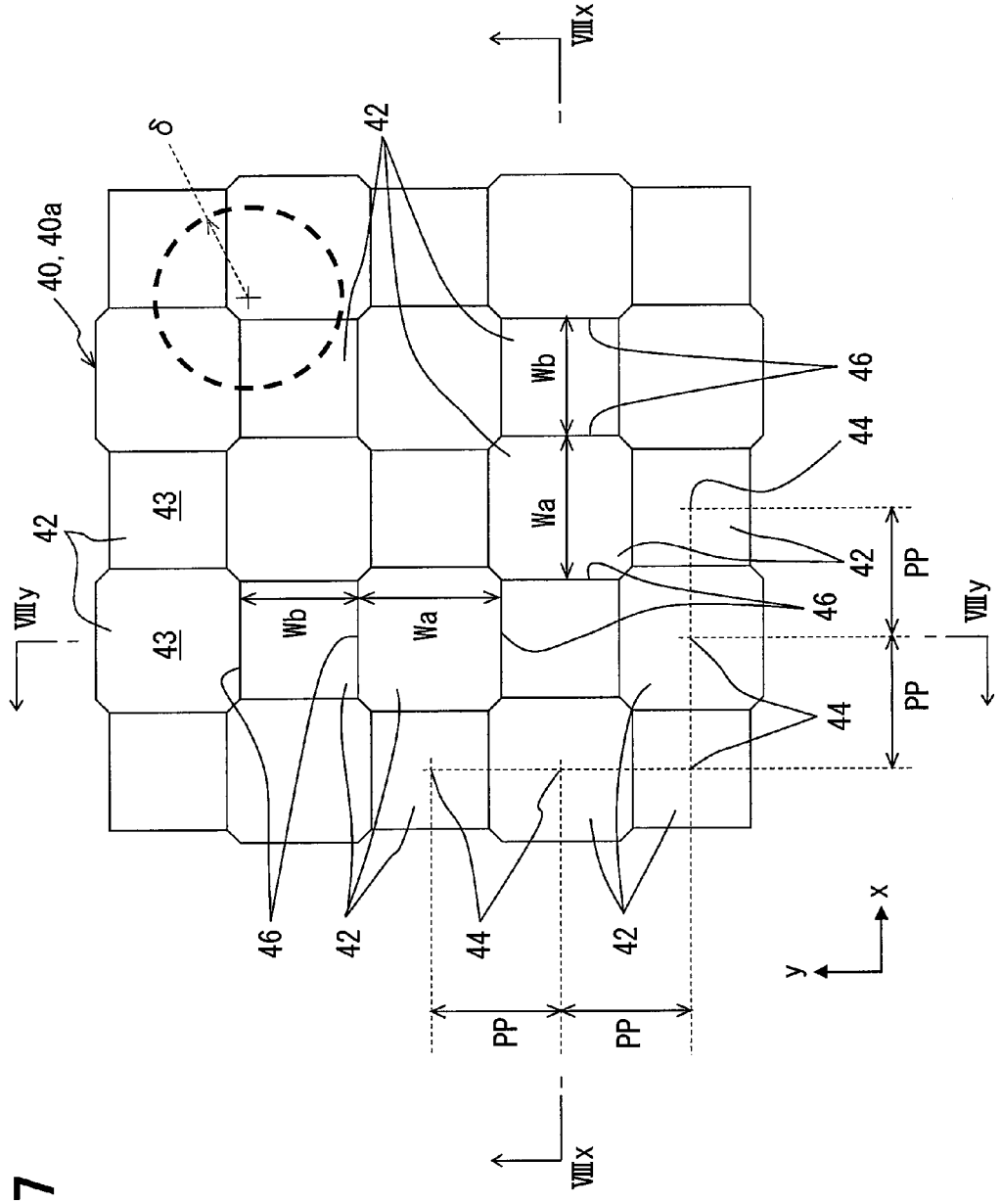
FIG. 7 is a top view partially illustrating the screen member in the first embodiment.
Figure 8:
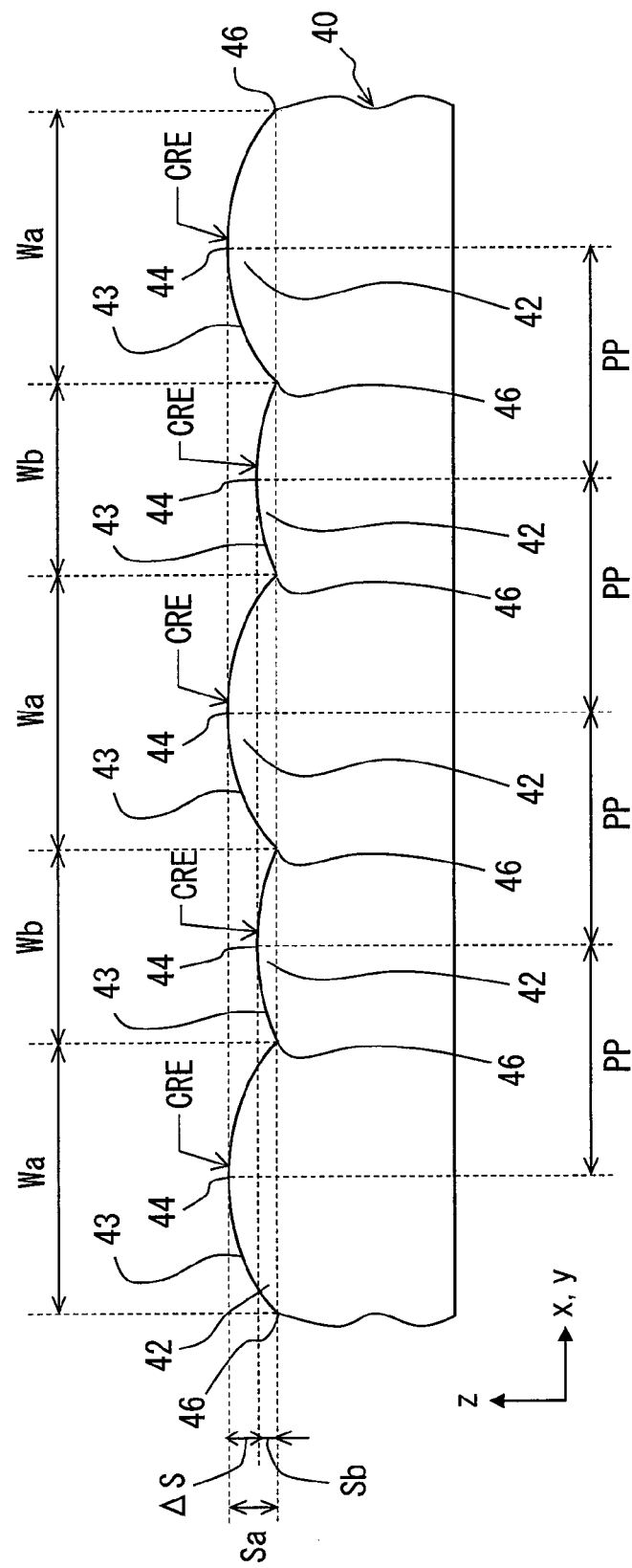
FIG. 8 is a diagram partially illustrating the screen member in the first embodiment, and is a schematic sectional diagram corresponding to cross-sectional line VIIIx-VIIIx and cross-sectional line VIIIy-VIIIy of FIG. 7.

Each of the optical elements 42 forms a mirror surface shaped curved surface 43, which provides a convex surface curve as a common curvature mode, on the outer surface of the screen member 40. The curved surface 43 in each of the optical elements 42 has a radius of curvature of CR, and of a direction z which is the orthogonal direction with respect to the directions x and y, protrudes to the side which faces the scanning mirror 30 of the projection optical system 20, and has a maximum protrusion point of a surface vertex 44. The optical elements 42 which are adjacent to each other in the directions x and y form mutual boundaries 46 due to the outer edges (outlines) of the curved surfaces 43 overlapping each other. Here, for the curved surface 43 of each of the optical elements 42, a depth which is the shifting amount from the surface vertex 44 which serves as a reference in the direction z to the boundary 46 (illustrated by the inflection points in the cross section of FIG. 8) is defined as a sag amount of the optical elements 42. In FIGS. 7 and 8, in order to facilitate understanding, only a portion of signs is added and depicted.

The height at the surface vertex 44 of the curved surface 43 differs between the optical elements 42 which are adjacent to each other. In other words, sag amounts which are different between optical elements 42 which are adjacent to each other are set for the entire area of the projection region 40a. Two types, large and small, of sag amount Sa and Sb are set for the sag amounts, and the optical elements 42 with the large sag amount Sa and the optical elements 42 with the small sag amount are arranged to alternate in both the directions x and y. A large element width Wa and a small element width Wb are set for the element widths of the optical elements 42. Here, a peak pitch PP corresponds to the distance between the surface vertices 44 of the adjacent optical elements 42.

According to the arrangement mode described above, a level difference is formed in the direction z corresponding to a difference ΔS between the sag amounts Sa and Sb, that is (Sa−Sb). Even in a single one of the optical elements 42, the height in the direction z is different depending on the location according to the curved surface 43 which forms the convex surface curve which is the radius of curvature CR. As a result, in the screen member 40, unevenness is formed in the projection region 40a.

In this manner, the screen member 40 reflects the light of the image which serves as the laser light fluxes which pass through the curved surfaces 43 which form the unevenness and are diffused. The light is reflected toward the concave mirror 52 of the magnifying optical system 50.

As illustrated in FIGS. 1 and 2, the magnifying optical system 50 is an optical system which magnifies the image, projects onto the windshield 3, and guides the light of the image to the visible region 4. Here, although the magnifying optical system 50 in the present embodiment includes the concave mirror 52, a configuration may be adopted in which a planar mirror which includes a planar reflecting surface, a magnifying lens, or the like is added in addition.

The concave mirror 52 is formed on the surface of a substrate which includes a synthetic resin, a glass, or the like by depositing aluminum as a reflecting surface 52a or the like. The reflecting surface 52a is formed in a smooth curved shape as a concave surface in which the center of the concave mirror 52 is depressed. The concave mirror 52 reflects the light of the image toward the windshield 3. The light of the image which is reflected by the windshield 3 in this manner reaches the visible region 4.

The concave mirror 52 is configured to be driven to rock according to a rocking signal from the controller 60 which is electrically connected. The formation position of the virtual image 6 and the visible region 4 rise and fall due to the concave mirror 52 rocking in this manner.

Detailed description of the visible region 4 of the HUD device 100 and the image which is visually recognized as the virtual image 6 will be given hereinafter. Hereinafter, description will be given on the premise that the screen member 40 (or the screen SCR) is disposed along an xy-plane which is formed from an x-axis and a y-axis, and the laser light flux is projected toward the negative direction of the z-axis onto the screen member 40 (or the screen SCR).

Figure 9:
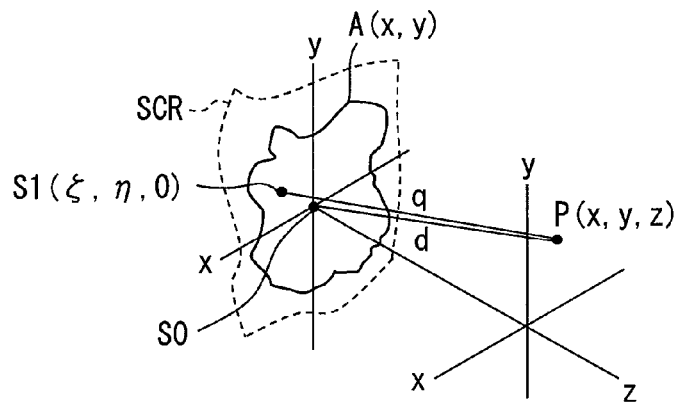
FIG. 9 is a schematic diagram for explaining a speckle pattern.

Generally, as illustrated in FIG. 9, according to the Kirchhoff-Fresnel diffraction formula, the wave surface of the light flux after the diffusion on the predetermined screen SCR is set to A (x, y, 0), and a wave surface U(P) at the point P (x, y, z) of observation of the wave surface A may be expressed as in Equation 3 depicted below as a mathematical expression.

$$U(P(x, y, z)) = -\frac{ik}{2\pi} \int\!\!\int_S A(\xi, \eta) \frac{\exp(ikq)}{q} dS \quad \text{[Equation 3]}$$

Where k is a wave number, and q is a distance from a point S1 (ξ, η, 0) to the point P (x, y, z).

Here, when the approximate expression of Equation 3 is obtained using a distance d from a point S0 (0, 0, 0) to the point P (x, y, z), the expression may be expressed as in Equation 4 depicted below as a mathematical expression.

$$U(P(x, y, z)) \sim -\frac{ik}{2\pi d} \int\!\!\int A(\xi, \eta) \exp(ikq) d\xi d\eta \quad \text{[Equation 4]}$$

When a distance q is extracted to the first term of a Taylor expansion and is substituted into Equation 4, the expression may be written as in Equation 5 which is depicted below as a mathematical expression. Based on Equation 5, the expression may be expressed as in Equations 6 and 7 as mathematical expressions.

$$U(P(x, y, z)) \sim -\frac{ik}{2\pi d} \exp\left(ik\frac{d}{2}\right) \quad \text{[Equation 5]}$$
$$\exp\left(ik\frac{z^2}{2d}\right) \int\!\!\int A(\xi, \eta) \exp\left(ik\frac{(x-\xi)^2 - (y-\eta)^2}{2d}\right) d\xi d\eta$$

$$U(P(x, y, z)) \propto A(x, y) \otimes F(x, y, d, k) \quad \text{[Equation 6]}$$

$$F(x, y, d, k) = \exp\left(ik\frac{x^2 + y^2}{2d}\right) \quad \text{[Equation 7]}$$

According to Equation 6, the wave surface U(P) which is observed is formulated in a mode in which an oscillation component F (x, y, d, k) is convoluted into the wave surface A (x, y, 0) after transmission of the screen SCR. According to the oscillation component F (x, y, d, k) depicted in Equation 7, it is understood that the wave surface U(P) changes when the coordinates (x, y) of the screen SCR are moved.

As in the present embodiment, in a case in which a laser light flux with high coherence is incident on the screen member 40 which has unevenness in the projection region 40a on which the image is formed, a speckle pattern is generated by the unevenness.

Figure 10:
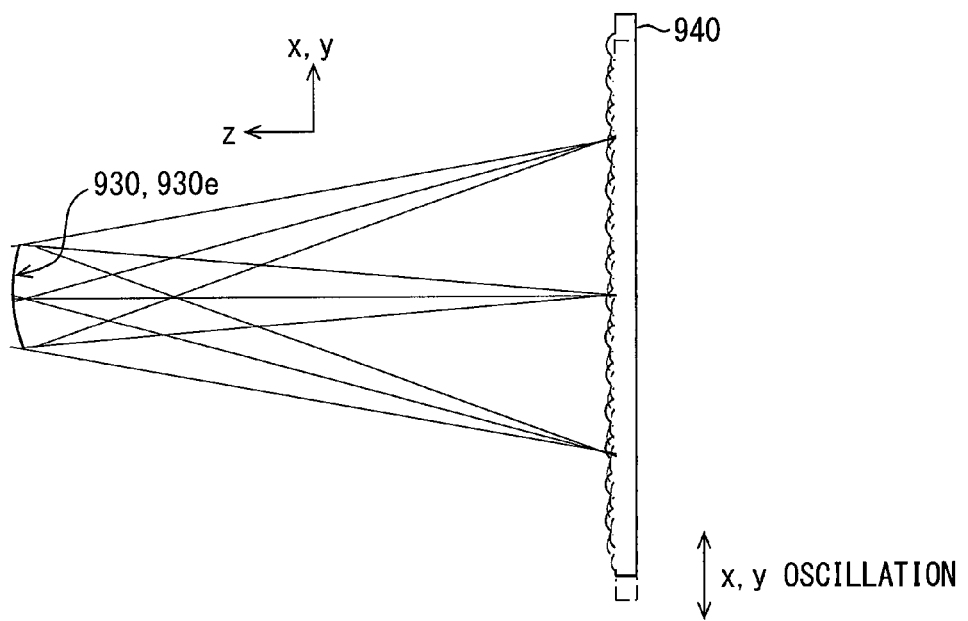
FIG. 10 is a diagram corresponding to FIG. 5 in a comparative example.

Here, in the comparative example illustrated in FIG. 10, the coordinates (x, y) of a screen member 940 onto which the laser light flux is projected from a scanning mirror 930 which includes a reflecting surface 930e with a fixed radius of curvature are caused to oscillate temporally. In the comparative example, since the oscillation component F (x, y, d, k) changes due to the oscillation of the screen member 940, the speckle pattern changes. By causing the speckle pattern to change temporally, the occupant may be caused to visually recognize in a state in which the luminance of the light of the image is temporally averaged. However, in consideration of point that moving the screen member 40 which has a higher occupancy ratio than the scanning mirror 30 or the like in the HUD device 100 is installed in a limited space of the vehicle 1, grounds for concern remain.

Therefore, in the present embodiment as illustrated in FIG. 5, a defocusing amount dS of the laser light flux in relation to the screen member 40 is caused to correspond to the distance d of Equation 7 and consideration is given. The speckle pattern temporally changing as wave surface change caused by causing the defocusing amount dS to temporally fluctuate is also conceivable. Causing the occupant to visually recognize in a state in which the light of the image is temporally averaged becomes possible.

In FIG. 5, the disposition between the scanning mirror 30 and the screen member 40 is schematically illustrated. In FIG. 5, although the laser light flux is illustrated in three directions, each moment in which the projection direction of the laser light flux is scanned is collectively illustrated in a single diagram in a schematic manner. In FIG. 5, the projection direction of the laser light flux is depicted using thin solid lines.

Figure 11:
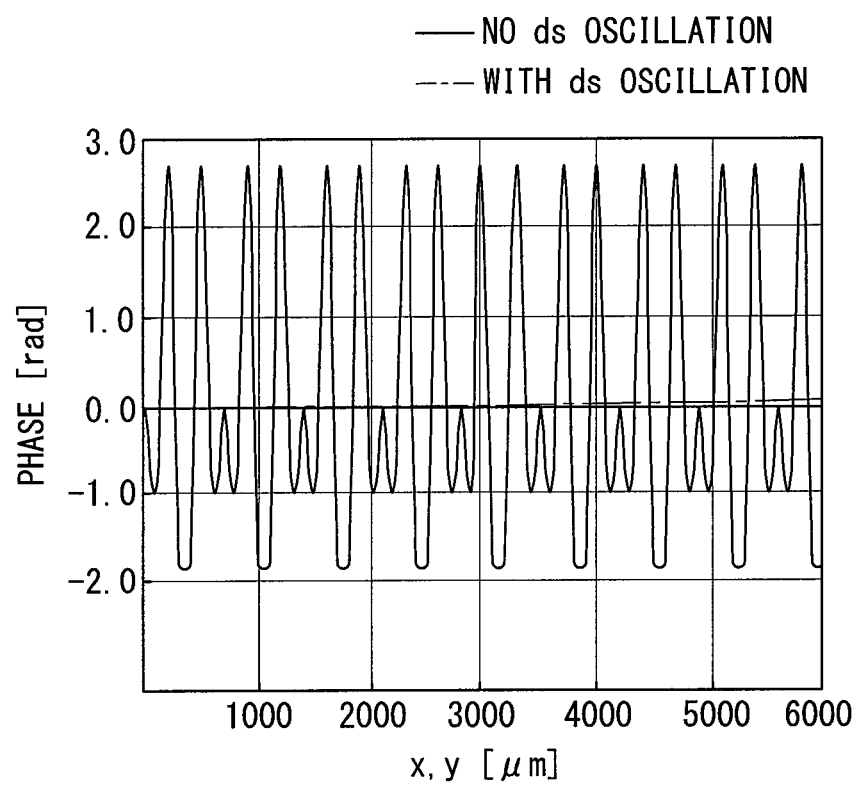
FIG. 11 is a schematic diagram illustrating results of simulating the phase distribution of an oscillation component in a case in which the focal length of the projection optical system oscillates and in a case in which the focal length of the projection optical system does not oscillate.

The spatial distribution of the phase in the oscillation component F (x, y, dS, k) of Equation 7 is plotted in FIG. 11. Accordingly, in a case in which the defocusing amount dS is fixed (the solid line graph), it is implied that the phase spatially changes, and a luminance distribution corresponding to the spatial distribution of the phase is obtained in the image which is visually recognized. On the other hand, in a case in which the defocusing amount dS temporally oscillates as in the present embodiment (the dot-dash line graph), it is implied that the spatial change in the phase is suppressed, and the luminance distribution corresponding to the spatial distribution of the phase is obtained in the image which is visually recognized.

In particular, in the first embodiment, as described above, due to the radius of curvature CRM of the reflecting surface 30e of the scanning mirror 30 temporally changing according to the drive signal of the controller 60, the focal length FL of the projection optical system 20 temporally oscillates. Due to the temporal oscillation of the focal length FL of the projection optical system 20, the defocusing amount dS of the laser light flux temporally oscillates in relation to the screen member 40.

In the projection region 40a of the screen member 40 onto which the laser light flux is projected, a radius of a region in which the speckle pattern is smoothened by the oscillation of the defocusing amount dS (hereinafter denoted as a smoothened region) is defined as R. Therefore, the phase of the oscillation component F (x, y, dS, k) in Equation 7 may assume a range from $-2\pi$ to $+2\pi$. Therefore, the defocusing amount dS is preferably set to the range of Equation 8 which is depicted below as a mathematical expression. Here, for the calculation, the center of the smoothened region is set to the coordinates (x, y)=(0, 0). In a case in which the defocusing amount dS assumes a positive value, this means that the focal point of the laser light flux is positioned closer to the scanning mirror 30 side than the projection region 40a, and the reverse is true in a case in which the defocusing amount dS assumes a negative value.

$$-\frac{R^2}{2\pi} \le d_S \le \frac{R^2}{2\pi} \quad \text{[Equation 8]}$$

Meanwhile, a spot radius $\delta$ of the laser light flux in the projection region 40a of the screen member 40 is approximated as in Equation 9 which is depicted below as a mathematical expression by the Rayleigh equation using the defocusing amount dS. Here, NA is defined as the numerical aperture of the optical system which generates the laser light flux, that is, the oscillators 10a to 10c and the projection optical system 20 which form the laser scanner 70. Additionally, $\lambda$ is the wavelength of the laser light flux.

$$\delta = \frac{0.61 \cdot \lambda}{2 \cdot NA} + |d_S| \cdot NA \quad \text{[Equation 9]}$$

Next, the size on the screen member which corresponds to the visually recognizable limit of the spot radius $\delta$ on the screen member 40 of the laser light flux is defined as $\Delta$. If Equation 10 which is depicted below which is denoted as a mathematical expression based on $\Delta > \delta$ is satisfied, the occupant becomes unable to visually recognize the spot of the laser light flux which corresponds to a single pixel in the visible region 4. Equation 10 may be further modified to obtain Equation 11 which is denoted below as a mathematical expression.

$$\Delta > \frac{0.61 \cdot \lambda}{2 \cdot NA} + \frac{R^2}{2 \cdot \lambda} \cdot NA \quad \text{[Equation 10]}$$

$$R < \sqrt{\left(\Delta - \frac{0.61 \cdot \lambda}{2 \cdot NA}\right)\left(\frac{2 \cdot \lambda}{NA}\right)} \quad \text{[Equation 11]}$$

Here, since the radius R of the smoothened region is preferably larger than $\Delta$, Equation 12 which is denoted below and is depicted as a mathematical expression which satisfies $\Delta < R$ is solved. According to Equation 12, Equation 13 which is denoted below as a mathematical expression may be obtained.

$$\Delta^2 - \frac{2 \cdot \lambda}{NA} \cdot \Delta - \frac{0.61 \cdot \lambda}{2 \cdot NA} \cdot \frac{2 \cdot \lambda}{NA} < 0 \quad \text{[Equation 12]}$$

$$NA < 1.62 \cdot \frac{\lambda}{\Delta} \quad \text{[Equation 13]}$$

Therefore, in the present embodiment, the numerical aperture NA is set such that Equation 13 is satisfied. In the first embodiment as described above, the MEMS scanning mirror 30 which is the scanning unit is used as an aperture for the setting of the numerical aperture NA. Specifically, under the condition that the size SR of the reflecting surface 30e is smaller than the spot size SS at the point of incidence of the laser light flux on the reflecting surface 30e, even in a case in which the defocusing amount dS assumes the maximum value, the size of the reflecting surface is set such that Equation 13 is satisfied.

Figure 12:
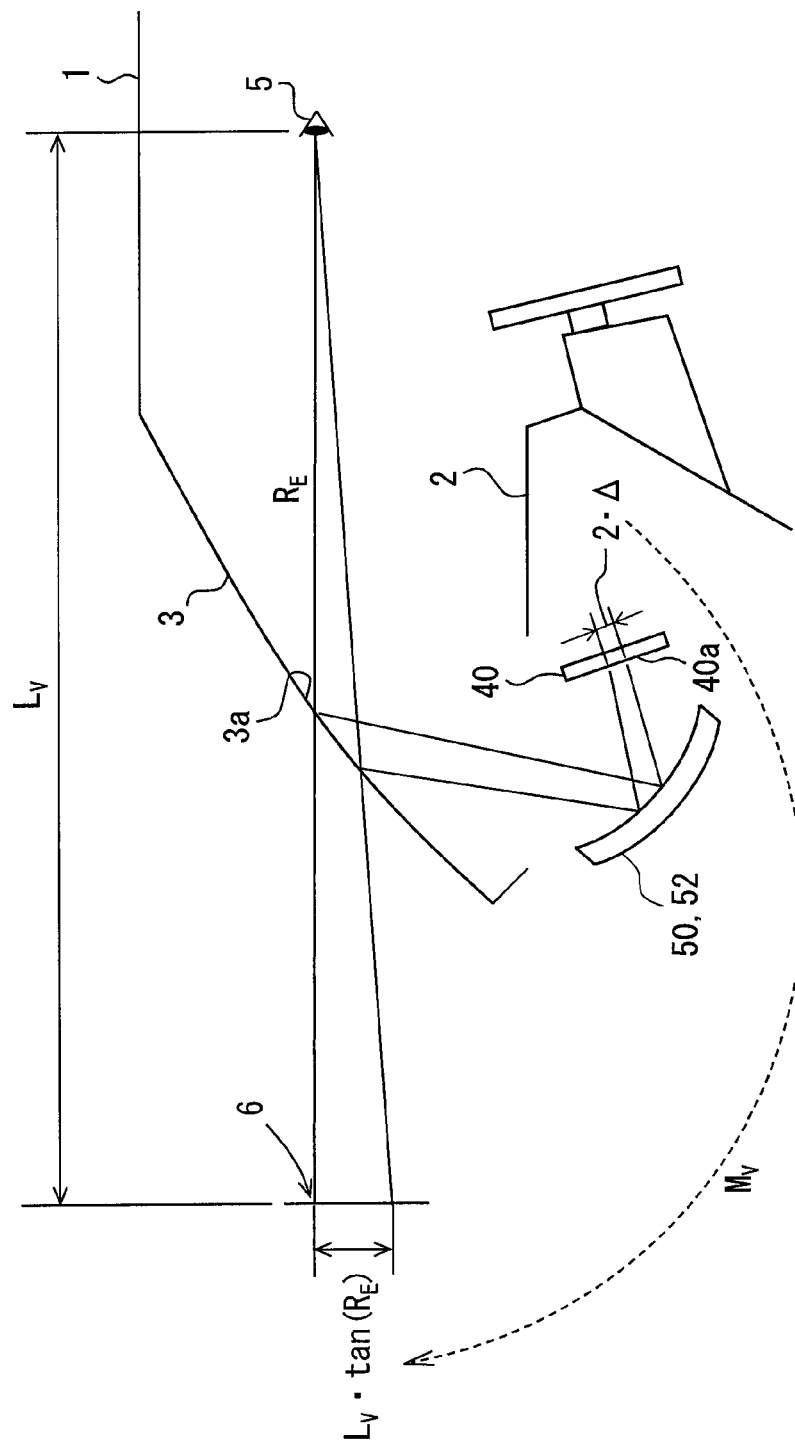
FIG. 12 is a schematic diagram for explaining a size A in the first embodiment.

As illustrated in FIG. 12, specifically, $\Delta$ is determined according to the light path in which the light of the image reaches the visible region 4, that is, is determined according to the disposition of the magnifying optical system 50 and the windshield 3 and the like. Here, the distance from the eye point 5 in the visible region 4 to the virtual image 6 is set to LV, the image forming magnification of the image forming system from the screen member 40 to the visible region 4 is set to MV, and a human resolution is set to RE. The radius Δ is represented as in Equation 14 which is depicted below as a mathematical expression.

$$\Delta = \frac{L_V \cdot \tan(R_E)}{2 \cdot M_V} \quad \text{[Equation 14]}$$

In particular, in the present embodiment, since the distance LV is 2 m and the image forming magnification MV is 6 times, when the resolution RE=1/60 which corresponds to general human eyesight 1.0 is adopted, Δ becomes 50 μm. Therefore, in Equation 13, when a wavelength 560 nm of the green laser light flux which has the highest sensitivity of being visually recognized among the wavelengths of laser light fluxes is substituted into λ, the numerical aperture NA may be set to less than or equal to 0.018. In particular, in the present embodiment, when the defocusing amount dS which oscillates assumes the maximum value, setting may be performed such that the numerical aperture NA=0.018.

Under the condition that Δ>δ, when the range of the appropriate defocusing amount dS is obtained based on Equation 8, Equation 15 which is depicted below is obtained as a mathematical expression.

$$|d_S| < \frac{\Delta}{NA} - \frac{0.61 \cdot \lambda}{2 \cdot NA^2} \quad \text{[Equation 15]}$$

When the values are substituted into the right side of Equation 15, the absolute value of the defocusing amount dS may be set to less than or equal to 2237 μm, and in particular in the present embodiment, the focal length FL of the projection optical system 20 temporally oscillates to assume such a range. The focal length FL of the projection optical system 20 periodically oscillates, and the oscillation period is set to be shifted from the frame rate in the operation of the scanning mirror 30 which is described above. In particular, in the present embodiment, the oscillation period is set to a value other than an integer multiple of the frame rate, for example, is set to 1/70 seconds.

The speckle pattern is temporally averaged by the oscillation of the focal length FL of the projection optical system 20 which is set as described above. The laser light flux which is reflected at the projection region 40a of the screen member 40 is diffused as the light of the image at a diffusion angle corresponding to the radius of curvature CRE which is set in the curved surface 43 of each of the optical elements 42, and the light corresponding to each single pixel reaches the visible region 4, each light having a width.

Figure 13:
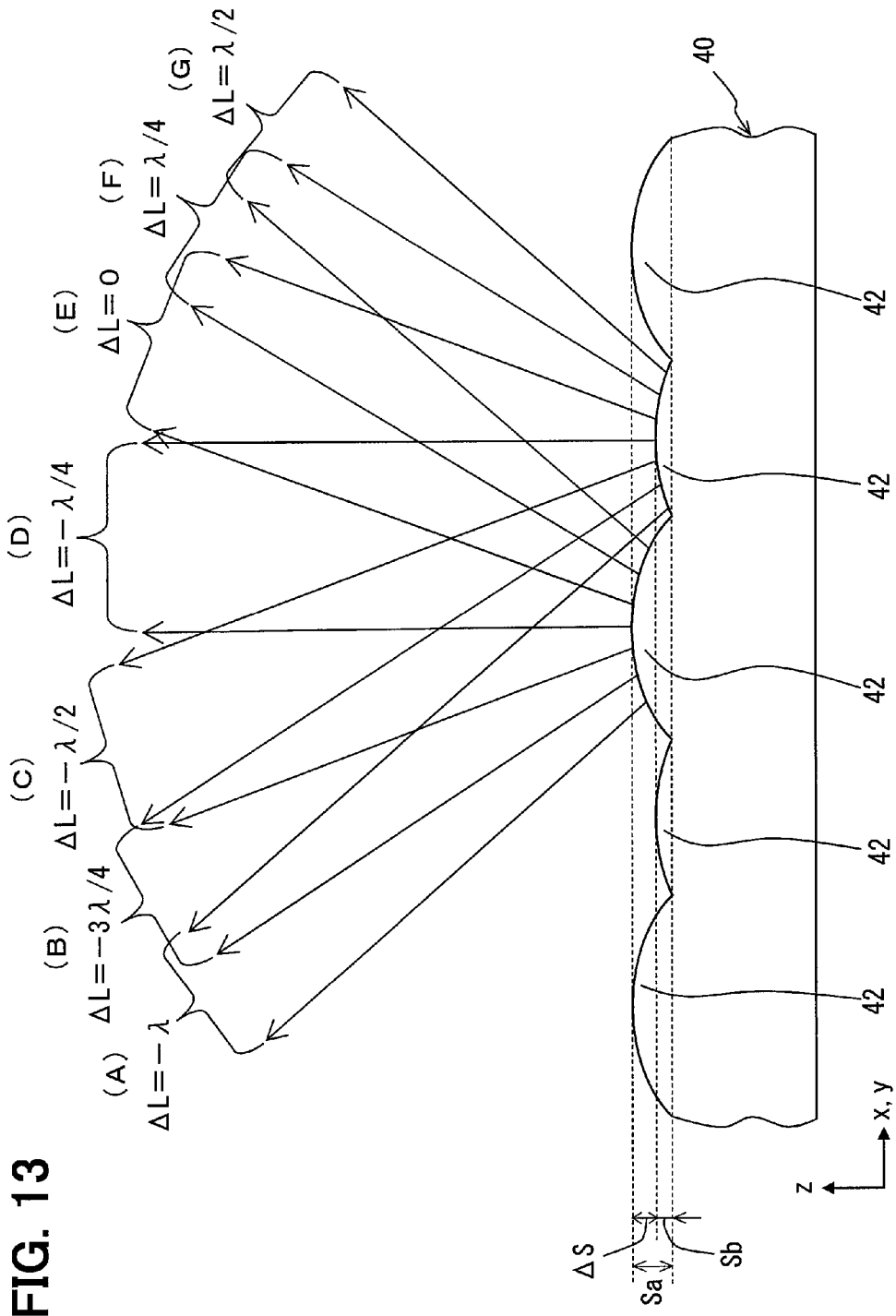
FIG. 13 is a schematic diagram for explaining an optical path difference in light which is emitted from a curved surface in the first embodiment.

After the laser light flux which is scanned by the scanning mirror 30 is diffused, interference which is caused by the grid arrangement of the optical elements 42 arises in the visible region 4 as the light of the image. Here, the optical path difference ΔL of the beams of light which are emitted at an emission angle θ, which is the reflection angle from the curved surfaces 43 of the surfaces of the optical elements 42 which are adjacent, and which interfere with each other is generated as in FIG. 13, for example. Here, under the approximation of sin θ≈θ [rad], the optical path difference ΔL is represented by Equation 16 and 17 which are denoted below as mathematical expressions using the peak pitch PP which is sufficiently larger than the ΔS. Specifically, Equation 16 is satisfied between a single optical element 42 with a large sag amount Sa, and an optical element 42 with a small sag amount Sb which is adjacent to the single optical element 42 on one side thereof (for example, the right side in FIG. 13). On the other hand, Equation 17 is satisfied between a single optical element 42 with a large sag amount Sa, and an optical element 42 with a small sag amount Sb which is adjacent to the single optical element 42 on the opposite side thereof (for example, the left side in FIG. 13).

$$\Delta L = PP \cdot \theta - 2 \cdot \Delta S \quad \text{[Equation 16]}$$

$$\Delta L = PP \cdot \theta + 2 \cdot \Delta S \quad \text{[Equation 17]}$$

An angle difference α of the emission angle θ at which the optical path difference ΔL changes by the amount of the wavelength λ, that is, the angle difference α of the emission angle θ, the order number of the diffraction peak which is generated by interference between beams of light is changed by 1, is represented by Equation 18 which is denoted below as a mathematical expression which uses the peak pitch PP in the same manner as the case of the comparative example.

$$\alpha = \frac{\lambda}{PP} \quad \text{[Equation 18]}$$

Figure 14:
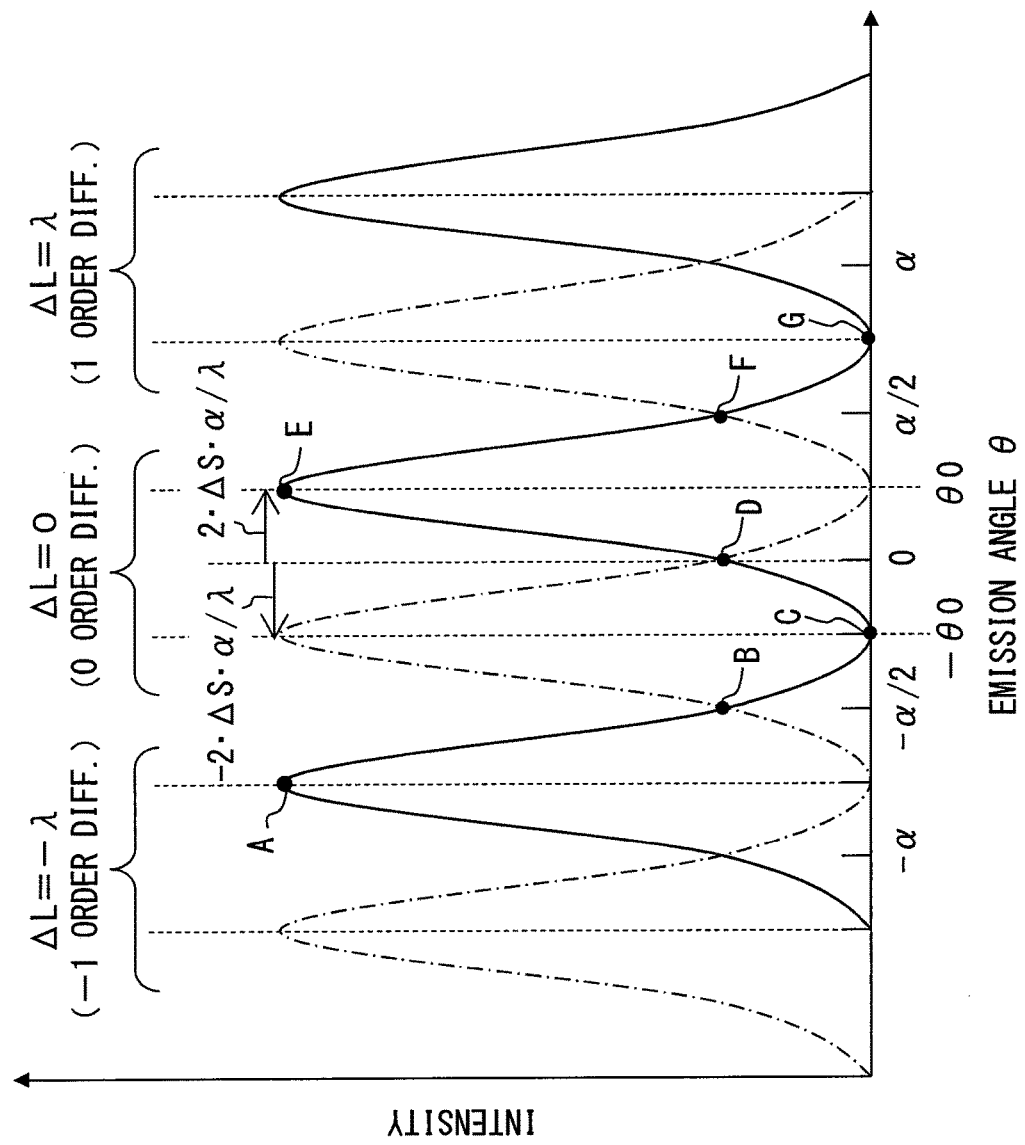
FIG. 14 is a schematic diagram for explaining an intensity distribution in light which is emitted from the curved surface in the first embodiment.

Considering the intensity distribution when the optical path difference ΔL in the first embodiment becomes 0, ±λ based on Equation 16 to 18, that is, when the order number of the diffraction peak becomes 0, ±1, it is understood that an intensity distribution corresponding to the angle difference α of the emission angle θ is assumed as in FIG. 14. In the intensity distribution, the diffraction peak which is generated between the single optical element 42 with a large sag amount Sa and the one-side adjacent element 42 with a small sag amount Sb according to Equation 16 and 18 occurs centered on the emission angle θ of every ±α from the zero order diffraction angle θ0 which is shifted by an amount of 2*ΔS*α/λ in relation to 0 (solid line graph). On the other hand, the diffraction peak which is generated between the single optical element 42 with a large sag amount Sa and the opposite-side adjacent element 42 with a small sag amount Sb according to Equation 17 and 18 occurs centered on the emission angle θ of every ±α from the zero order diffraction angle θ0 which is shifted by an amount of −2*ΔS*α/λ in relation to 0 (dot-dash line graph).

In the first embodiment in which ΔS=λ/8 is set, for example, the diffraction peaks of the diffracted light which are generated by a single optical element 42 between the single optical element 42 and the adjacent elements 42 of both sides thereof are shifted from each other due to occurring centered on emission angles θ which are different from each other. As a result of the shifting effect, the diffraction peaks which are generated by the single optical element 42 between the single optical element 42 and the adjacent elements 42 on both sides thereof do not easily strengthen each other.

Figure 15:
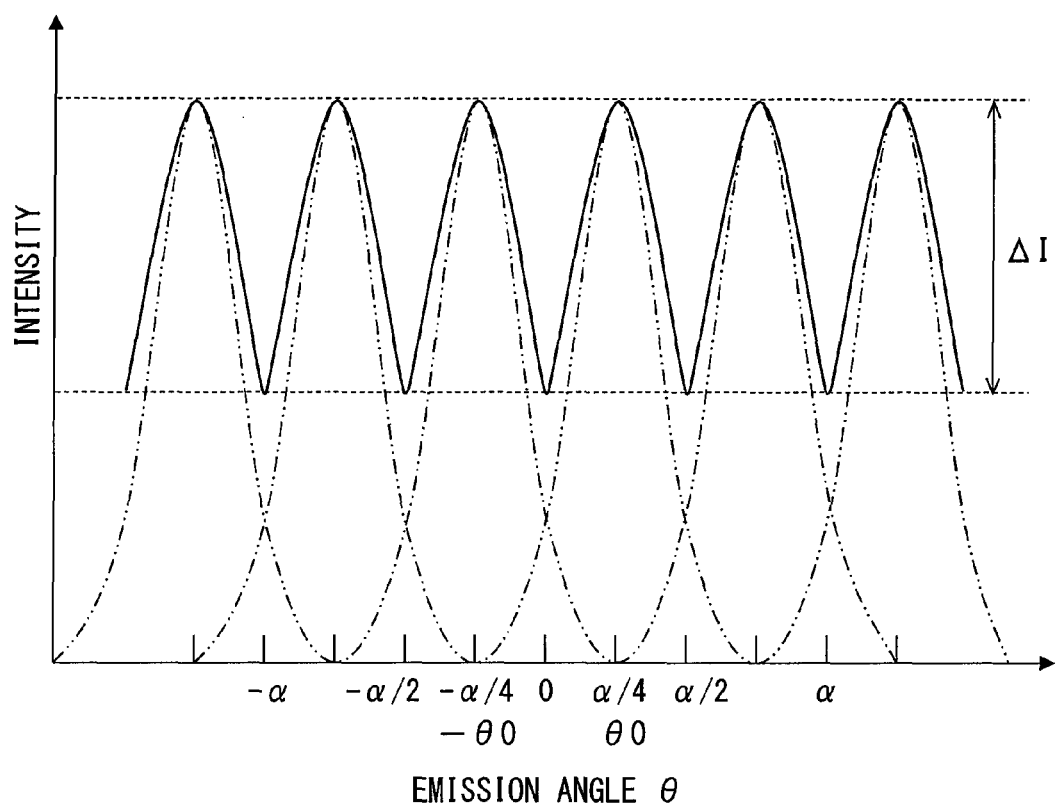
FIG. 15 is a schematic diagram for explaining the superposition of light which is emitted from the curved surface in the first embodiment.

According to the above description, in the intensity distribution (the solid line graph) of FIG. 15 in which the diffracted light (the two dot-dash line graph) which is generated by the single optical element 42 between the single optical element 42 and the adjacent elements 42 on both sides thereof is superposed, between the emission angles θ (every ±α from each of θ0 and −θ0) which correspond to the diffraction peaks, and the emission angles θ therebetween, an intensity difference ΔI decreases. In other words, the setting of a sag amount difference ΔS means that the intensity difference of the light in each location in the visible region 4 is decreased.

In the first embodiment, the controller 60 forms "the variable focal point unit".

(Operations and Effects)

The operations and effects of the first embodiment which are described above will be described hereinafter.

According to the first embodiment, the oscillators 10a to 10c which oscillate laser light fluxes, the screen member 40 which has unevenness and forms an image, the projection optical system 20 which projects the laser light fluxes onto the screen member 40 and in which the focal length FL is caused to temporally oscillate by the drive signal of the controller 60, and the magnifying optical system 50 which guides light of an image to the visible region 4 by magnifying the image and projecting the image onto the windshield 3 are provided. Accordingly, the laser light flux is projected onto the screen member which has unevenness as light in which the speckle pattern is temporally averaged while the focal length FL of the projection optical system 20 oscillates in the projection direction due to the drive signal of the controller 60.

The light of the image which is formed by the screen member 40 is diffused by the unevenness, and is guided to the visible region 4 while the image is magnified by the magnifying optical system 50. Therefore, it is possible to provide the HUD device 100 which secures the appropriate visible region 4, suppresses luminance inconsistencies in an image which is visually recognized, and easily secures space for installing the HUD device, which displays an image of an easily visually recognizable size as a virtual image, on the vehicle 1.

According to the first embodiment, the projection optical system 20 temporally scans the projection direction of the laser light flux, and the oscillation period in which the focal length FL periodically oscillates is shifted from the frame rate of the scanning. Accordingly, due to the temporal scanning of the laser light flux, the image may be easily formed on the screen member 40, and the influence on a small smoothened region caused by the speckle pattern may be suppressed easily. Due to the oscillation period which is shifted from the frame rate, projection is performed onto the screen member 40 which has unevenness as light in which the speckle pattern is reliably temporally averaged. The light of the image which is formed by the screen member 40 is diffused by the unevenness, and is guided to the visible region while the image is magnified by the magnifying optical system 50. The HUD device 100 which secures the appropriate visible region 4, suppresses luminance inconsistencies in an image which is visually recognized, and easily secures space may be provided.

According to the first embodiment, the orientation of the reflecting surface 30e which reflects the laser light flux changes in the scanning mirror 30 of a micro electro mechanical system due to the scanning signal of the controller 60. The controller 60 causes the radius of curvature CRM of the reflecting surface 30e to temporally vary using a drive signal. Accordingly, since the reflecting surface 30e temporally varies, it is possible to realize the oscillation of the scanning mirror 30 and the focal length FL using a common member. Since the positional relationship between the reflecting surface 30e and the projection portion on the screen member remains maintained, variations in the angle of view of the image may be suppressed.

According to the first embodiment, the MEMS scanning mirror 30 forms the transmission portion 30g which allows the laser light flux to pass through in the periphery of the reflecting surface 30e. Accordingly, the numerical aperture NA of the oscillators 10a to 10c and the projection optical system 20 may be easily set using the transmission portion 30g which is formed in the MEMS scanning mirror 30. Therefore, it is possible to provide the HUD device 100 which secures the appropriate visible region 4, suppresses luminance inconsistencies in an image which is visually recognized, and easily secures space for installing the HUD device, which displays an image of an easily visually recognizable size as a virtual image, on the vehicle 1.

According to the first embodiment, the screen member 40 includes multiple optical elements 42 which are arranged in a grid in the projection region 40a, each of the optical elements 42 forms a mirror surface shaped curved surface 43 which has a common curvature mode of the convex surface curves and the concave surface curves on the surface of the screen member 40, and causes the laser light flux to diffuse through the curved surface 43. Accordingly, the arrangement and the radius of curvature CRE of the optical elements 42 may be set such that the appropriate visible region 4 may be obtained while suppressing the influence of the speckle pattern using the mirror surface shaped curved surface 43.

According to the first embodiment, the height at the surface vertex 44 of the curved surface 43 differs between the optical elements 42 which are adjacent to each other. Accordingly, the diffraction peaks of the diffracted light which are generated by the single optical element 42 between the single optical element 42 and the adjacent optical elements 42 on both sides thereof are shifted from each other. Using the shifting effect, the luminance inconsistencies which arise in the locations of the visible region 4 may be suppressed, and thus, a more suitable visible region 4 may be secured.

According to the first embodiment, since the numerical aperture NA is set such that the mathematical expression Equation 13 is satisfied, even if the image which is visually recognized is magnified, the spot radius δ is not visually recognized by sight, and the luminance inconsistencies in the image which is visually recognized are no longer conspicuous.

According to the first embodiment, the numerical aperture NA is less than or equal to 0.018. Accordingly, in a case in which the oscillator 10a, which oscillates the green laser light flux which has the highest sensitivity of visual recognition, is used in the HUD device 100 of a standard image forming magnification MV, even if the image which is visually recognized is magnified, the spot radius δ is not visually recognized by sight, and the luminance inconsistencies in the image which is visually recognized are no longer conspicuous.

According to the first embodiment, the absolute value of the defocusing amount dS is set such that the mathematical expression Equation 15 is satisfied. Accordingly, the laser light flux is projected onto the screen member 40 which has unevenness as light which is temporally averaged while the focal length FL of the projection optical system 20 oscillates in the projection direction. Here, the suppression effect of the luminance inconsistencies of the image which is visually recognized is increased by the defocusing of a range in which the spot radius δ is not visually recognized by sight.

According to the first embodiment, the absolute value of the defocusing amount dS is less than or equal to 2237 μm. Accordingly, in a case in which the oscillator 10a, which oscillates the green laser light flux which has the highest sensitivity of visual recognition, is used in the HUD device 100 of a standard image forming magnification MV, the suppression effect of the luminance inconsistencies in the image which is visually recognized is increased by the defocusing of a range in which the spot radius δ is not visually recognized by sight.

Second Embodiment

Figure 16:
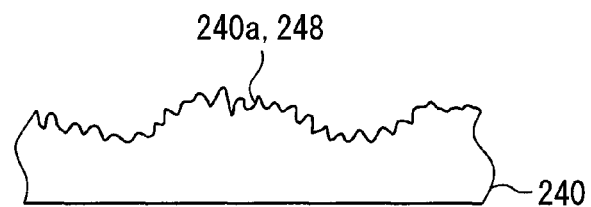
FIG. 16 is a schematic cross-sectional view partially illustrating a screen member in a second embodiment.

As illustrated in FIG. 16, the second embodiment of the present disclosure is a modification example of the first embodiment. Description will be given of the second embodiment, centered on the points which differ from the first embodiment.

A screen member 240 in the second embodiment is a reflective screen which is mainly formed of a synthetic resin or the like, for example. The screen member 240 includes a diffusion surface 248 which has unevenness in a projection region 240a due to surface textures. In other words, unevenness is provided in the projection region 240a.

Here, the embossment-like fine unevenness in the diffusion surface 248 is formed unintentionally by a surface etching process, for example; however, the unevenness may be formed by coating or the like of a coating material onto the surface.

The screen member 240 reflects the light of the image which is diffused through the diffusion surface 248 which has unevenness toward the concave mirror 52 of the magnifying optical system 50.

Even in the second embodiment which is described above, in the same manner as in the first embodiment, the focal length FL of the projection optical system 20 temporally oscillates due to the drive signal from the controller 60. Therefore, the operations and effects equivalent to those of the first embodiment may be realized.

According to the second embodiment, the screen member 240 includes the diffusion surface 248 which has unevenness in the projection region 240a due to surface textures, and diffuses the laser light flux through the diffusion surface 248. Accordingly, the appropriate visible region 4 may be secured in an easily manufacturable manner due to the embossment-like unevenness.

Third Embodiment

Figure 17:
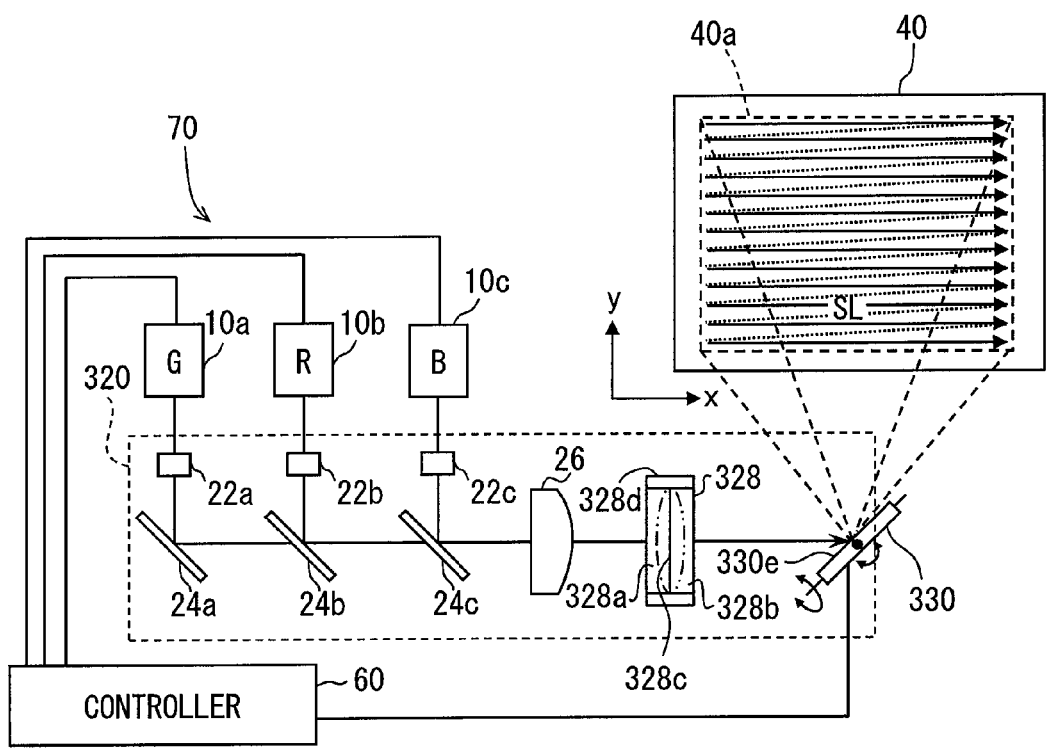
FIG. 17 is a diagram corresponding to FIG. 3 in the third embodiment.

As illustrated in FIG. 17, the third embodiment of the present disclosure is a modification example of the first embodiment. Description will be given of the third embodiment, centered on the points which differ from the first embodiment.

A projection optical system 320 of the third embodiment is an optical system which projects a laser light flux onto the screen member 40 in the same manner as in the first embodiment. The projection optical system 320 of the third embodiment includes the three shaping lenses 22a to 22c, the three dichroic filters 24a to 24c, the condenser lens 26, a variable focal point lens 328, and a MEMS scanning mirror 330. Of these, the three shaping lenses 22a to 22c, the three dichroic filters 24a to 24c, and the condenser lens 26 are the same as in the first embodiment. In the third embodiment, the laser light flux which passes through the condenser lens 26 is propagated toward the variable focal point lens 328.

Here, a controller 360 of the third embodiment is electrically connected to the variable focal point lens 328 in addition to the oscillators 10a to 10c, the scanning mirror 330, and the like.

The variable focal point lens 328 in the third embodiment is a liquid lens in which a boundary surface 328c between a high conductivity liquid 328a and a low conductivity liquid 328b varies due to the drive signal from the controller 360. Specifically, the variable focal point lens 328 seals an aqueous solution which serves as the high conductivity liquid 328a and an oil which serves as the low conductivity liquid 328b, which have different refractive indexes from each other, inside a cylindrical container 328d. When a voltage corresponding to the drive signal from the controller 360 is applied to the variable focal point lens 328, the radius of curvature CRB of the boundary surface 328c between the high conductivity liquid 328a and the low conductivity liquid 328b varies. In other words, the laser light flux is diffracted in accordance with the lens focal length which varies according to the radius of curvature CRB of the boundary surface 328c. By using the variable focal point lens 328 in which the lens focal length fluctuates in this manner, the focal length FL (also refer to FIG. 6) of the projection optical system 20 becomes capable of temporally oscillating.

In the same manner as in the first embodiment, the scanning mirror 330 is a scanning mirror which functions as a scanning unit which temporally scans the projection direction of the laser light flux. However, the scanning mirror 330 of the third embodiment forms a reflecting surface 330e in a planar shape, and does not have a function of a fluctuating radius of curvature.

Even in the third embodiment which is described above, in the same manner as in the first embodiment, the focal length FL of the projection optical system 320 temporally oscillates due to the drive signal from the controller 360. Therefore, the operations and effects equivalent to those of the first embodiment may be realized.

According to the third embodiment, the variable focal point lens 328 in which the power fluctuates is used for the oscillation of the focal length FL of the projection optical system 320. Accordingly, the temporal oscillation of the focal length FL of the projection optical system 320 may be easily realized. Therefore, the appropriate visible region 4 may be secured, and the luminance inconsistencies in the image which is visually recognized may be suppressed.

In the third embodiment, the controller 360 configures the "variable focal point unit".

Other Embodiments

Above, description is given of multiple embodiments; however, the present disclosure is not to be interpreted as being limited to the embodiments, and may be applied to various embodiments and combinations in a scope which does not depart from the intent of the present disclosure.

Figure 18:
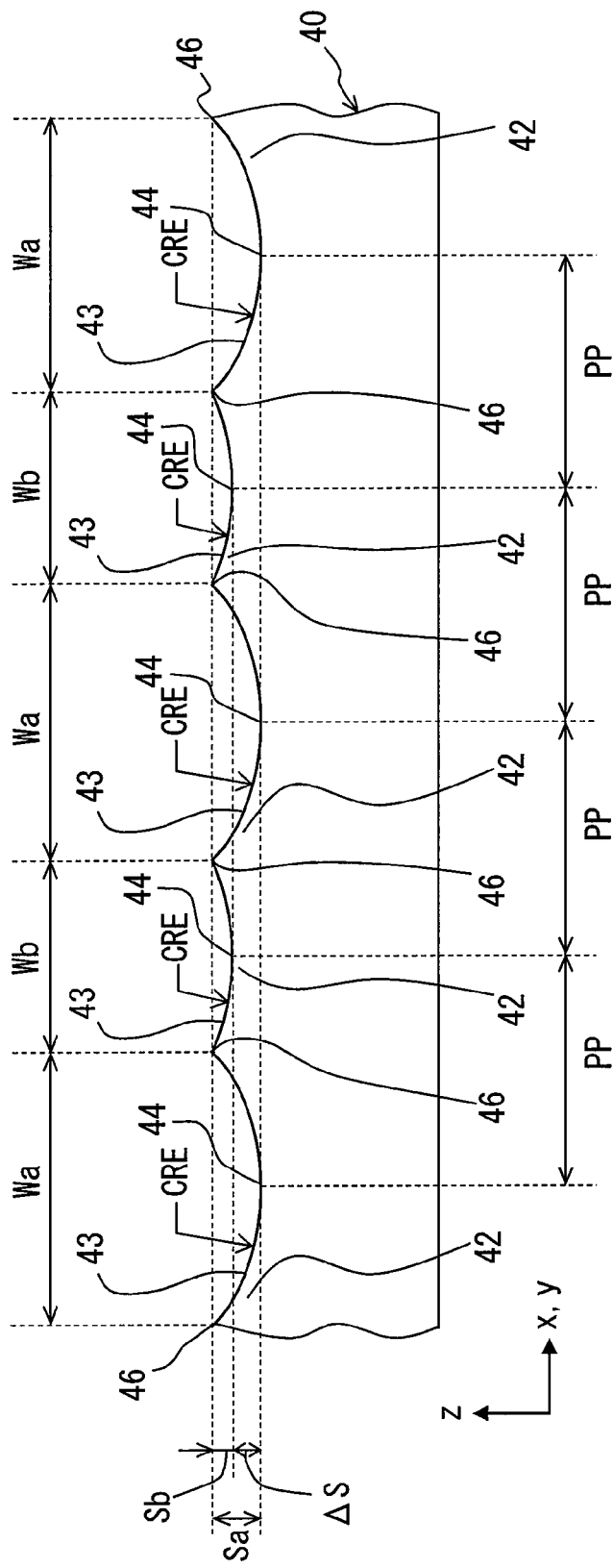
FIG. 18 is a diagram corresponding to FIG. 7 in a first modification example.

Specifically, for the first modification example relating to the first and third embodiments, the curved surfaces 43 of the optical elements 42 may have a common curvature mode among the concave surface curves and the convex surface curves. For example, as illustrated in FIG. 18, each of the optical elements 42 may form a mirror surface shaped curved surface 43 which has a concave surface curve as the curvature mode on the outside surface of the screen member 40.

Figure 19:
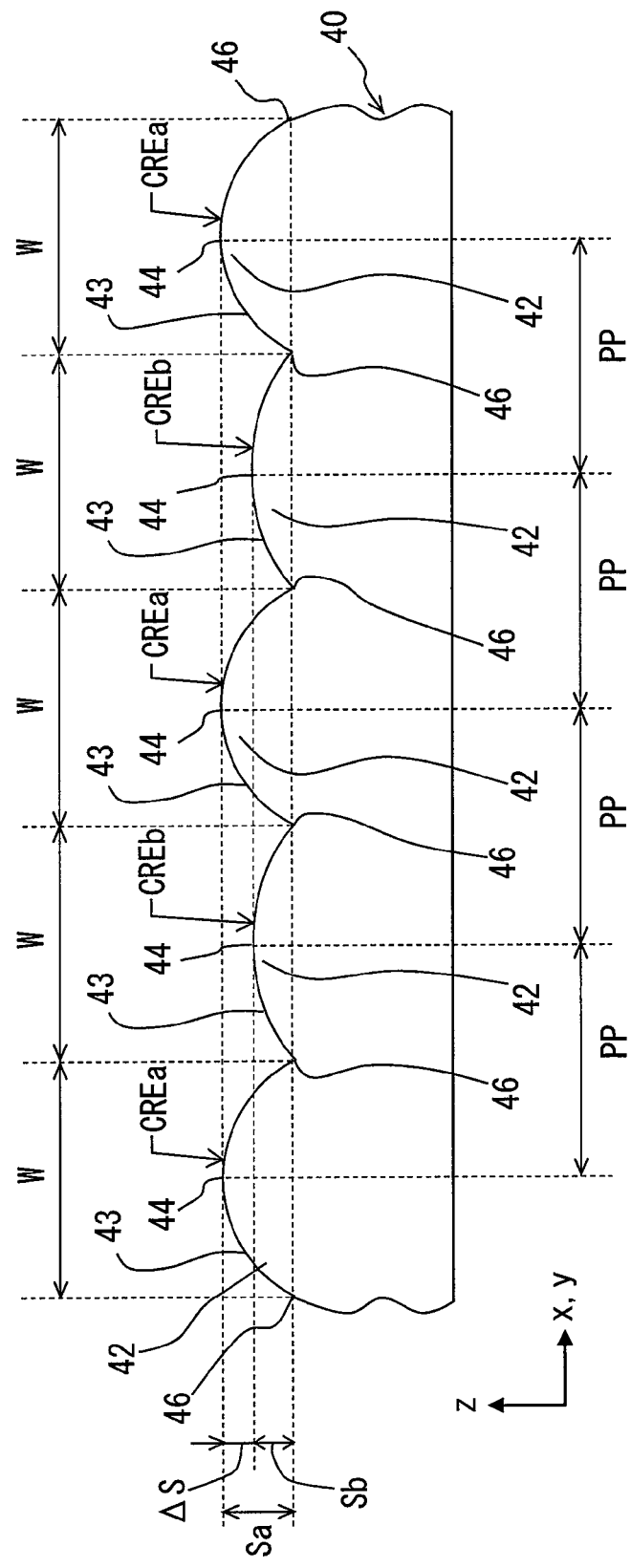
FIG. 19 is a diagram corresponding to FIG. 7 in a second modification example.

For the second modification example which is related to the first and the third embodiments, as illustrated in FIG. 19, in the optical elements 42 which are adjacent to each other, radius of curvatures CREa and CREb which are different from each other may be set, and the same element width W may be set.

For the third modification example which is related to the first and the third embodiments, the height at the surface vertex 44 of the curved surface 43 may effectively match between the optical elements 42 which are adjacent to each other.

Figure 20:
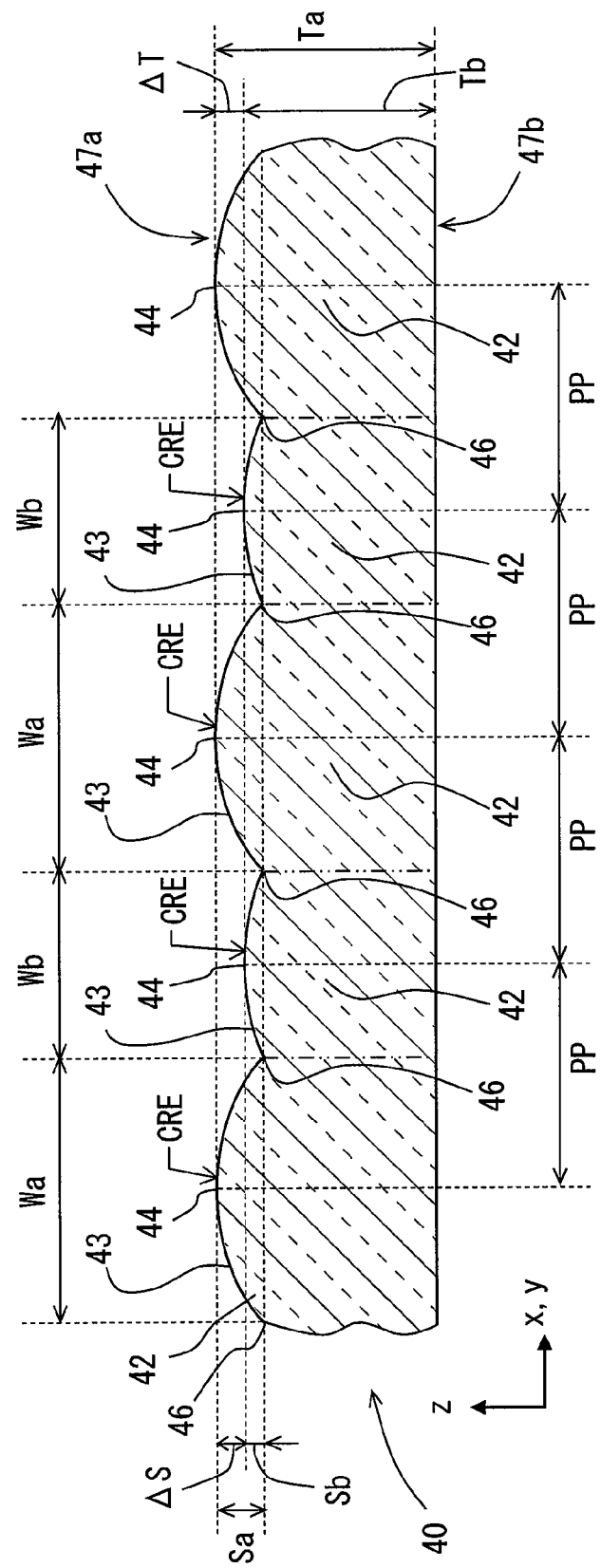
FIG. 20 is a diagram corresponding to FIG. 7 in an example of a fourth modification example.
Figure 21:
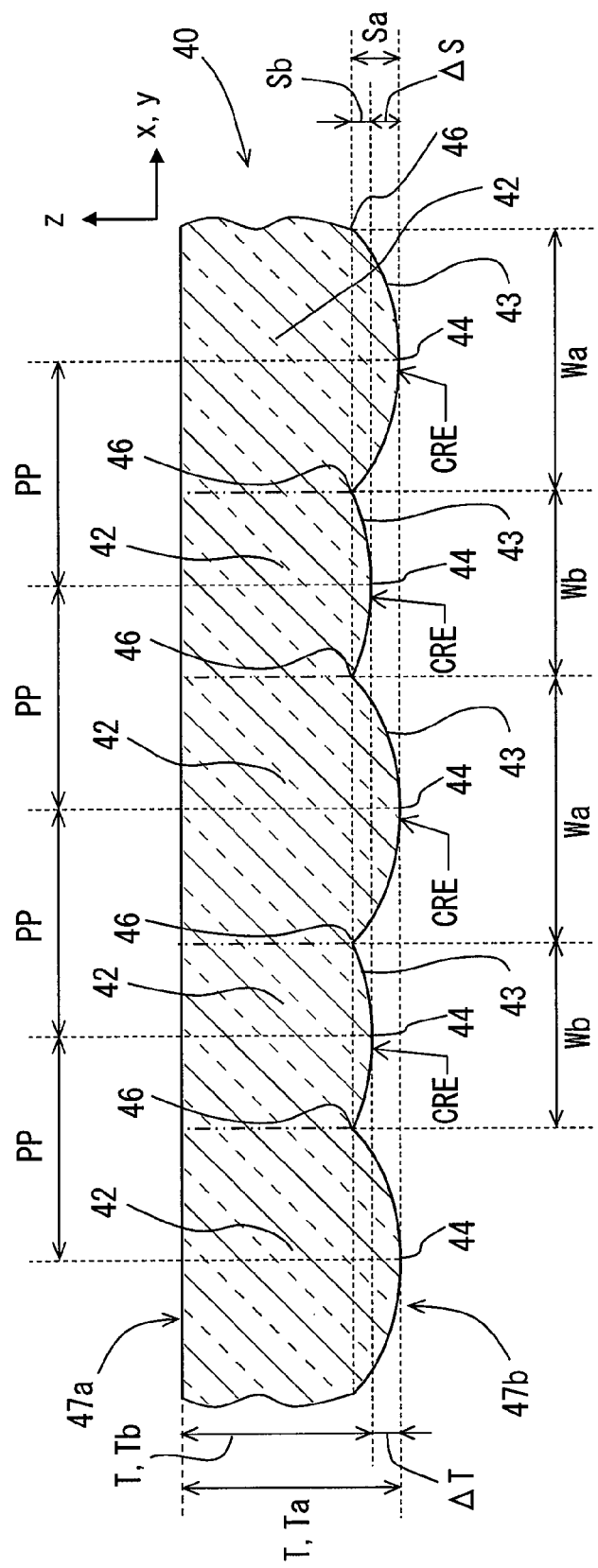
FIG. 21 is a diagram corresponding to FIG. 7 in a different example from FIG. 20 of the fourth modification example.

For the fourth modification example which is related to the first and the third embodiments, as illustrated in FIGS. 20 and 21, the screen member 40 is a transmission type screen which is formed of a synthetic resin, a glass, or the like which has light transmissive properties, and may be formed as a micro lens array which includes multiple optical elements 42 which are arranged in a grid and have unevenness in the projection region 40a. In the example illustrated in FIG. 20, the curved surface 43 is formed on an entrance-side outer surface 47a of the scanning mirror 30 side, a thickness Ta at the surface vertex 44 of the optical element 42 of the large sag amount Sa and a thickness Tb at the surface vertex 44 of the optical element 42 of the small sag amount Sb are set, and the difference in the thicknesses is ΔT. Meanwhile, in the example illustrated in FIG. 21, the curved surface 43 is formed on an emission-side outer surface 47b of the magnifying optical system 50 side.

For a fifth modification example which is related to the second embodiment, the screen member 240 is a transmission type screen which is formed of a synthetic resin, a glass, or the like which has light transmissive properties, and due to the surface being subjected to surface texturing, the screen member 240 may include the diffusion surface 248 which has unevenness in the projection region 240a due to the surface textures.

For a sixth modification example which is related to the first and the second embodiments, the projection optical system 20 may not be configured to allow the laser light flux to pass through the periphery of the reflecting surface 30e of the scanning mirror 30. In this example, for example, a separate aperture may be provided in the projection optical system 20, and the numerical aperture NA may be controlled by the oscillators 10a to 10c.

For a seventh modification example which is related to the first to the third embodiments, the numerical aperture NA may not be set such that Equation 13 which is described earlier is satisfied. The defocusing amount dS may not be set such that Equation 15 which is described earlier is satisfied.

For an eighth modification example which is related to the first to the third embodiments, the oscillators 10a to 10c may oscillate laser light fluxes of other wavelengths as long as the light is visible light, and the image may be formed using one color, two colors, or greater than or equal to four colors of laser light flux.

For a ninth modification example which is related to the first to the third embodiments, as long as the focal length FL of the projection optical system 20 temporally oscillates according to the drive signal of the controller 60, the focal length FL may not oscillate periodically. For example, the focal length may oscillate randomly.

For a tenth modification example which is related to the third embodiment, a liquid crystal lens in which the refractive index fluctuates according to a voltage may be used for the variable focal point lens 328.

For an eleventh modification example which is related to the first to the third embodiments, the "variable focal point unit" may be configured using something other than the controller 60 which is electrically connected to the optical elements of the projection optical system 20.

For a twelfth modification example which is related to the first to the third embodiments, the present disclosure may be applied to various moving objects (transportation equipment) other than the vehicle 1 such as a marine vessel or an airplane.

What is claimed is:

1. A head-up display device, mounted on a moving object, that displays an image as a virtual image in a visible region in a manner that is visually recognizable to an occupant by projecting the image onto a projection member, comprising:
   an oscillator which oscillates laser light flux;
   a screen member which has unevenness in a projection region in which the image is formed by projection of the laser light flux;
   a projection optical system which projects the laser light flux onto the screen member;
   a magnifying optical system which magnifies the image, projects the image onto the projection member, and guides light of the image to the visible region; and
   a variable focal point unit which causes a focal length of the projection optical system to temporally oscillate.

2. The head-up display device according to claim 1, wherein the projection optical system includes a scanning unit which temporally scans a projection direction of the laser light flux, and
   wherein an oscillation period in which the variable focal point unit causes the focal length to periodically oscillate is shifted from a frame rate of scanning of the scanning unit.

3. The head-up display device according to claim 2, wherein the scanning unit is a scanning mirror of a micro electro mechanical system in which an orientation of a reflecting surface which reflects the laser light flux changes, and
   wherein the variable focal point unit causes a radius of curvature of the reflecting surface to temporally fluctuate.

4. The head-up display device according to claim 3, wherein the scanning mirror forms a transmission portion which transmits the laser light flux in a periphery of the reflecting surface.

5. The head-up display device according to claim 1, wherein the screen member includes a plurality of optical elements which are arranged in a grid in the projection region and which have unevenness, and
   wherein each of the optical elements forms a mirror surface shaped curved surface, which has a common curvature mode of convex surface curves and concave surface curves, on a surface of the screen member, and each of the optical elements causes the laser light flux to diffuse through the curved surface.

6. The head-up display device according to claim 5, wherein a height at a surface vertex of the curved surface differs between adjacent ones of the optical elements.

7. The head-up display device according to claim 1, wherein the screen member includes a diffusion surface which has unevenness in the projection region due to surface texturing, and diffuses the laser light flux through the diffusion surface.

8. The head-up display device according to claim 1, wherein when a numerical aperture of the oscillator and the projection optical system is defined as NA, a wavelength of the laser light flux is defined as λ, and a size on the screen member which corresponds to a visually recognizable limit of a spot radius δ on the screen member of the laser light flux is defined as Δ, Equation 1 which is denoted below is satisfied $$NA < 1.62 \cdot \frac{\lambda}{\Delta}. \qquad \text{[Equation 1]}$$

9. The head-up display device according to claim 8, wherein the numerical aperture is less than or equal to 0.018.

10. The head-up display device according to claim 1, wherein when a numerical aperture of the oscillator and the projection optical system is defined as NA, a wavelength of the laser light flux is defined as λ, a size on the screen member at which a spot radius δ may not be visually recognized by sight when the laser light flux is projected onto the screen member is defined as Δ, and a defocusing amount dS of the laser light flux in relation to the screen member is defined as dS, Equation 2 which is denoted below is satisfied $$|d_S| < \frac{\Delta}{NA} - \frac{0.61 \cdot \lambda}{2 \cdot NA^2}. \qquad \text{[Equation 2]}$$

11. The head-up display device according to claim 10, wherein an absolute value of the defocusing amount is less than or equal to 2237 μm.

12. The head-up display device according to claim 1, wherein the variable focal point unit uses a variable focal point lens in which a lens focal length varies.

\* \* \* \* \*